US008031367B2

(12) United States Patent
Takahashi et al.

(10) Patent No.: US 8,031,367 B2
(45) Date of Patent: Oct. 4, 2011

(54) EJECTION DEVICE AND EJECTION METHOD WITH UNEVEN LIQUID EJECTION CONTROL EFFECT

(75) Inventors: Toru Takahashi, Matsumoto (JP); Takamitsu Kondo, Shiojiri (JP); Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 570 days.

(21) Appl. No.: 12/251,309

(22) Filed: Oct. 14, 2008

(65) Prior Publication Data

US 2009/0096825 A1 Apr. 16, 2009

(30) Foreign Application Priority Data

Oct. 15, 2007 (JP) ................................ 2007-267573

(51) Int. Cl.
*H04N 1/034* (2006.01)
*H04N 1/401* (2006.01)
*B41J 2/01* (2006.01)

(52) U.S. Cl. ....... 358/1.9; 358/3.14; 358/3.26; 358/502; 347/12; 347/14

(58) Field of Classification Search .................. 358/1.9, 358/3.06, 3.09, 3.13, 3.14, 3.21, 3.26, 502, 358/534; 347/5, 9, 12, 13, 15, 40
See application file for complete search history.

(56) References Cited

U.S. PATENT DOCUMENTS 6,254,217 B1 * 7/2001 Askeland et al. ............... 347/43
7,742,195 B2 * 6/2010 Kakutani ..................... 358/3.13
7,830,553 B2 * 11/2010 Kakutani ..................... 358/3.14

FOREIGN PATENT DOCUMENTS

JP 08-217302 8/1996
JP 2005-236768 9/2005
JP 2005-269527 9/2005
JP 2006027139 A * 2/2006

* cited by examiner

*Primary Examiner* — Scott A Rogers
(74) *Attorney, Agent, or Firm* — DLA Piper LLP (US)

(57) ABSTRACT

A liquid ejection device of the invention is constructed to eject a liquid to an ejection object. The liquid ejection device has a dot data generator configured to generate dot data from given image data, where the dot data represents a dot creation state in each pixel set on the ejection object. The liquid ejection device also has a liquid ejector equipped with a nozzle array including multiple nozzles aligned in a specific direction substantially perpendicular to a scanning direction. The liquid ejector makes multiple scans of the nozzle array in the scanning direction in a common printing area according to the generated dot data and ejects the liquid to the ejection object to create dots. The dot data generator has a specific print mode that generates corrective dot data by skipping a virtual dot array created by one scan from a group of dot arrays to be created by the multiple scans of the nozzle array, in order to prevent a potential contact with a dot array to be created by another scan. This arrangement desirably prevents unevenness of liquid ejection caused by a meandering scan of at least either the liquid ejector or the ejection object.

7 Claims, 28 Drawing Sheets

First Modification mod(i, n): Reminder by Dividing Row Number i by Parameter n
mod(j, n): Reminder by Dividing Column Number j by Parameter n Dot Pattern before Skipping Dot Pattern after Skipping Another Skipped Pattern in First Modification mod(i, n): Reminder by Dividing Row Number i by Parameter n
mod(j, n): Reminder by Dividing Column Number j by Parameter n Second Embodiment

| | 1st Column | 2st Column | 3st Column | 4st Column | 5st Column | 6st Column | 7st Column | 8st Column |
|---|---|---|---|---|---|---|---|---|
| 1st Row | 1 | 1 | 1 | 1 | 2 | 2 | 2 | 2 |
| 2st Row | 2 | 2 | 2 | 2 | 1 | 1 | 1 | 1 |
| 3st Row | 1 | 1 | 1 | 1 | 2 | 2 | 2 | 2 |
| 4st Row | 2 | 2 | 2 | 2 | 1 | 1 | 1 | 1 |
| 5st Row | 1 | 1 | 1 | 1 | 2 | 2 | 2 | 2 |
| 6st Row | 2 | 2 | 2 | 2 | 1 | 1 | 1 | 1 |
| 7st Row | 1 | 1 | 1 | 1 | 2 | 2 | 2 | 2 |
| 8st Row | 2 | 2 | 2 | 2 | 1 | 1 | 1 | 1 |

AL

Vibrating Direction

Paper Feed Direction

Dot Number Allocation Table

Low-Frequency Unevenness (Y Ink)

Reduction of Low-Frequency Unevenness (Y Ink) in Second Embodiment

256 Pixels

64 Pixels

M

| | | | | | | | | | | | | | | | | | |
|---|---|---|---|---|---|---|---|---|---|---|---|---|---|---|---|---|---|
| 1 | 177 | 58 | 170 | 70 | 186 | 79 | 161 | 94 | 171 | 16 | 164 | 24 | 158 | 227 | 6 | 133 | 157 |
| 255 | 109 | 212 | 42 | 242 | 5 | 223 | 48 | 209 | 67 | 248 | 81 | 234 | 132 | 56 | 120 | 253 | |
| 123 | 33 | 127 | 181 | 83 | 155 | 105 | 140 | 30 | 150 | 119 | 182 | 40 | 89 | 220 | 163 | 44 | |
| 219 | 91 | 237 | 22 | 121 | 198 | 61 | 188 | 111 | 215 | 3 | 98 | 201 | 140 | 10 | 95 | | |
| 11 | 195 | 53 | 136 | 227 | 37 | 247 | 12 | 233 | 52 | 192 | 135 | 32 | 246 | 113 | 194 | | |
| 99 | 144 | 107 | 184 | 68 | 172 | 97 | 151 | 77 | 173 | 84 | 237 | 123 | 61 | 167 | 46 | | |
| 225 | 40 | 251 | 6 | 217 | 116 | 28 | 196 | 125 | 35 | 207 | 17 | 153 | 203 | 24 | | | |
| 87 | 169 | 78 | 162 | 59 | 146 | 211 | 64 | 254 | 142 | 72 | 178 | 87 | 118 | 228 | | | |
| 190 | 15 | 202 | 111 | 238 | 19 | 93 | 169 | 8 | 110 | 221 | 49 | 249 | 2 | 144 | | | |
| 74 | 246 | 134 | 43 | 174 | 128 | 230 | 50 | 216 | 154 | 26 | 168 | 79 | 184 | | | | |
| 176 | 30 | 98 | 219 | 86 | 34 | 139 | 195 | 101 | 56 | 241 | 127 | 213 | 37 | | | | |
| 69 | 148 | 196 | 2 | 159 | 247 | 89 | 11 | 136 | 185 | 92 | 14 | 108 | | | | | |
| 187 | 41 | 126 | 226 | 106 | 57 | 190 | 115 | 235 | 36 | 208 | 121 | 229 | | | | | |
| 81 | 214 | 92 | 53 | 145 | 204 | 27 | 166 | 74 | 157 | 82 | 165 | 31 | | | | | |
| 232 | 21 | 170 | 240 | 13 | 132 | 252 | 51 | 222 | 4 | 245 | 48 | | | | | | |
| 130 | 155 | 55 | 115 | 183 | 78 | 122 | 196 | 102 | 180 | 65 | 173 | | | | | | |
| 72 | 252 | 100 | 211 | 45 | 231 | 20 | 148 | 39 | 133 | 205 | | | | | | | |
| 202 | 32 | 179 | 5 | 163 | 95 | 191 | 86 | 239 | 111 | 29 | | | | | | | |
| 104 | 143 | 58 | 243 | 70 | 218 | 63 | 161 | 9 | 209 | | | | | | | | |
| 64 | 236 | 129 | 110 | 151 | 25 | 199 | 49 | 172 | 68 | | | | | | | | |
| 171 | 17 | 208 | 38 | 225 | 131 | 99 | 254 | 113 | | | | | | | | | |
| 80 | 191 | 87 | 174 | 76 | 189 | 13 | 143 | | | | | | | | | | |
| 247 | 35 | 152 | 2 | 248 | 55 | | | | | | | | | | | | |
| 140 | 108 | 197 | 127 | 96 | | | | | | | | | | | | | |
| 13 | 215 | 46 | 229 | | | | | | | | | | | | | | |
| 164 | 90 | 180 | | | | | | | | | | | | | | | |
| 52 | 253 | | | | | | | | | | | | | | | | |
| 205 | | | | | | | | | | | | | | | | | |

$$VTF(u) = 5.05 \cdot \exp\left(\frac{-0.138\pi L \cdot u}{180}\right)\left\{1 - \exp\left(\frac{-0.1\pi L \cdot u}{180}\right)\right\} \cdots F1$$

$$\text{Granularity Index} = K \int FS(u) \cdot VTF(u)du \cdots F2$$

Creation of Dots Corresponding to Processed Threshold Value Storage Elements and Storage Candidate Element ●: Corresponding to Processed Threshold Value Storage Element ✱: Corresponding to Storage Candidate Element Creation of Dots Corresponding to Processed Threshold Value Storage Elements and Storage Candidate Element ●: Corresponding to Processed Threshold Value Storage Element

*: Corresponding to Storage Candidate Element

Fig.27

Quantified Dot Creation State (All Pixels)

| | 1st Column | 2st Column | 3st Column | 4st Column | 5st Column | 6st Column | 7st Column | 8st Column |
|---|---|---|---|---|---|---|---|---|
| 1st Row | 1 | 0 | 0 | 0 | 0 | 0 | 0 | 0 |
| 2st Row | 0 | 0 | 0 | 0 | 1 | 0 | 0 | 0 |
| 3st Row | 0 | 1 | 0 | 0 | 0 | 0 | 0 | 0 |
| 4st Row | 0 | 0 | 0 | 0 | 0 | 1 | 0 | 0 |
| 5st Row | 1 | 0 | 0 | 0 | 0 | 0 | 0 | 0 |
| 6st Row | 0 | 0 | 0 | 0 | 1 | 0 | 0 | 0 |
| 7st Row | 0 | 1 | 0 | 0 | 0 | 0 | 0 | 0 |
| 8st Row | 0 | 0 | 0 | 0 | 0 | 0 | 1 | 0 |

Dda1

Total Dot-On Number: 8

First Modification of Second Embodiment

Dot Number Allocation Table

Fig.31

Dda1

| | 1 | 2 | 3 | 4 | 5 | 6 | 7 | 8 |
|---|---|---|---|---|---|---|---|---|
| 1 | 1 | 0 | 0 | 0 | | | | |
| 2 | | | | | 1 | 0 | 0 | 0 |
| 3 | 0 | 1 | 0 | 0 | | | | |
| 4 | | | | | 0 | 1 | 0 | 0 |
| 5 | 1 | 0 | 0 | 0 | | | | |
| 6 | | | | | 1 | 0 | 0 | 0 |
| 7 | 0 | 1 | 0 | 0 | | | | |
| 8 | | | | | 0 | 0 | 1 | 0 |

Dda2

| | 1 | 2 | 3 | 4 | 5 | 6 | 7 | 8 |
|---|---|---|---|---|---|---|---|---|
| 1 | | | | | 0 | 0 | 0 | 0 |
| 2 | 0 | 0 | 0 | 0 | | | | |
| 3 | | | | | 0 | 0 | 0 | 0 |
| 4 | 0 | 0 | 0 | 0 | | | | |
| 5 | | | | | 0 | 0 | 0 | 0 |
| 6 | 0 | 0 | 0 | 0 | | | | |
| 7 | | | | | 0 | 0 | 0 | 0 |
| 8 | 0 | 0 | 0 | 0 | | | | |

Fig.32

Calculation Equation of Evaluation Value $$G = Ga \times Wa + (Gg1 + Gg2) \times Wg$$

G : Evaluation Value
Ga : Granularity Index (All Pixels)
Gg1 : Granularity Index (First Pixel Group)
Gg2 : Granularity Index (Second Pixel Group)
Wa : Weighting Coefficient (Granularity Index)
Wg : Weighting Coefficient (Granularity Index in Each Pixel Group)

EJECTION DEVICE AND EJECTION METHOD WITH UNEVEN LIQUID EJECTION CONTROL EFFECT

CROSS-REFERENCE TO RELATED APPLICATION

The present application claims the priority from Japanese application P2007-267573A filed on Oct. 15, 2007, the contents of which are hereby incorporated by reference into this application.

BACKGROUND

1. Field of the Invention

The present invention relates to a technique of ejecting a liquid to a liquid ejection object while scanning at least one of a liquid ejection head and the liquid ejection object.

2. Description of the Related Art

Printing devices have widely been used as an output device of images generated by computers and images taken with digital cameras. The printing device creates ink dots during scans on a printing medium to complete a printed image on the printing medium. The printing device generally creates dots and prints an image on the printing medium, while scanning at least one of a print head and the printing medium. In the line printer designed to complete a printed image by one scan, degradation of the printed image is ascribed to a meandering scan. A technique has been proposed to control the meandering of a paper feed scan (scan of the printing medium) and thereby prevent such image degradation (see, for example, Japanese Patent Laid-Open No. H08-217302).

There has, however, been no specific consideration about dot creation control with a view to preventing such image degradation. The inventors of the present application have found image degradation due to a meandering scan not only in the line printer but in the serial printer designed to complete a printed image by multiple scans. Such image degradation is not restrictive in printing devices but is commonly found in various liquid ejection devices as the problem of uneven liquid ejection.

SUMMARY

In order to solve the problem of the prior art described above, there would be a demand for preventing unevenness of liquid ejection caused by a meandering scan of either a liquid ejector or an ejection object.

The present invention accomplishes at least part of the demand mentioned above and the other relevant demands by the following configurations applied to the liquid ejection device.

According to one aspect of the present invention, a liquid ejection device is constructed to eject a liquid to an ejection object. The liquid ejection device has: an ejection head structured to have a nozzle array including multiple nozzles aligned in a specific direction crossing a scanning direction; a dot data generator configured to generate dot data from given data, where the dot data represents a dot creation state corresponding to droplets of the liquid to be ejected in each unit set on the ejection object; and a liquid ejector configured to make multiple scans of the ejection head with the nozzle array in the scanning direction in a common printing area according to the generated dot data and eject droplets of the liquid to the ejection object to create dots. The dot data generator has a specific print mode that generates corrective dot data by skipping a virtual dot array created by at least one scan from a group of dot arrays to be created by the multiple scans of the nozzle array, in order to prevent a potential contact with a dot array to be created by another scan.

The liquid ejection device according to this aspect skips a virtual dot array created by at least one scan from a group of dot arrays to be created by the multiple scans of the nozzle array and thereby generates the corrective dot data that is characteristic of preventing the potential contact of the virtual dot array with a dot array to be created by another scan. This arrangement effectively prevents unevenness of liquid ejection due to a mutual contact of adjacent dot arrays. The corrective dot data may be generated by skipping dot data representing the virtual dot array from preset dot data representing the group of dot arrays or may be originally generated as skipped dot data. In the latter case, the skipped dot data may be generated by an error diffusion method specifically arranged to or with a dither matrix specifically adjusted to set large threshold values for dots as skipping targets.

In one preferable application of the liquid ejection device according to the above aspect of the invention, the print mode generates the corrective dot data by applying a dither matrix designed to skip dots at positions having a potential for the contact with the dot array to be created by the another scan, as the virtual dot array created by the at least one scan.

In the liquid ejection device of this application, the dither matrix may be designed to have a minimum potential for succession of dots in the specific direction crossing the scanning direction.

The dither matrix includes not only a dither matrix itself but a conversion table or a corresponding relation table created according to the dither matrix and adopted in the technique of using intermediate data or dot number data for specifying a dot creation state as disclosed in Japanese Patent Laid-Open No. 2005-236768 or Japanese Patent Laid-Open No. 2005-269527. The conversion table may be created directly from the dither matrix of the invention or may be adjusted and modified with the dither matrix of the invention.

In one preferable embodiment of the invention, the liquid ejection device having any of the above configurations has a liquid ejection head constructed to have multiple nozzle arrays arranged apart from each other across a preset distance in the scanning direction. Only one scan of the liquid ejection head makes the multiple nozzle arrays simultaneously eject the liquid to the ejection object and thereby completes the multiple scans of the ejection head in the scanning direction in the common printing area.

In one concrete example, multiple nozzle arrays are arranged apart from each other in the main scanning direction as shown in FIGS. 3 and 4. The 'liquid ejection head' of the invention corresponds to a combination of two print heads 10A and 10B in this concrete example and may be provided as one integral body or as separate bodies. The 'multiple scans' of the invention correspond to respective scans of two black ink nozzle arrays K, two cyan ink nozzle arrays C, two magenta ink nozzle arrays Mz, and two yellow ink nozzle arrays Y in the concrete example. Namely the 'multiple scans' are eight scans by the respective nozzle arrays performed in one scan of the two print heads 10A and 10B corresponding to the 'liquid ejection head'.

In another preferable application of the liquid ejection device of the invention having any of the above configurations, the multiple scans of the ejection head in the scanning direction in the common printing area include plural scans of ejecting an identical liquid at mutually zigzag positions in the specific direction crossing the scanning direction. An ejection amount of the liquid in at least one remaining scan out of the plural scans is increased to compensate for a potential decrease in total ejection amount of the liquid caused by skipping the virtual dot array created by the at least one scan.

This arrangement easily compensates for the decreased amount of liquid ejection caused by skipping the virtual dot array.

The technique of the invention is not restricted to the liquid ejection device having any of the configurations described above but may be actualized by diversity of other applications, for example, a liquid ejection method, a printing device, a printing method, a method of creating a print or another liquid painted matter, computer programs executed by the computer to actualize any of these devices and methods, recording media in which such computer programs are recorded, and data signals configured to include such computer programs and embodied in carrier waves.

In the liquid ejection device and the liquid ejection method of the invention or in the method of creating a print or another liquid painted matter, the dot on-off state in each pixel is determined by comparing a tone value of image data in the pixel with a threshold value set at a corresponding pixel position in a dither matrix. The dot on-off state in each pixel may alternatively be determined by comparing the sum of the tone value in the pixel and the threshold value at the corresponding pixel position with a fixed value. The dot on-off state in each pixel may otherwise be determined without directly using the threshold value but according to the tone value in the pixel and data set in advance based on the threshold value at the corresponding pixel position. The dither method adopted in the liquid ejection device of the invention generally determines the dot on-off state in each pixel according to the tone value in the pixel and the threshold value set at the corresponding pixel position in the dither matrix.

BRIEF DESCRIPTION OF THE DRAWINGS

FIG. 27 shows a dot density matrix Dda1 given as a quantitative expression of dot density representing a quantified dot creation state with setting on the dots corresponding to storage candidate elements and the dots corresponding to processed threshold values storage elements;

FIG. 31 shows two dot density matrices corresponding to the two pixel groups in the third modified example of the second embodiment;

FIG. 32 shows a calculation equation of an evaluation value using the two dot density matrices in the third modified example of the second embodiment.

DESCRIPTION OF THE PREFERRED EMBODIMENTS

In order to further clarify the functions, the effects, and the advantages of the invention, some modes of carrying out the invention are described below as preferred embodiments in the following sequence with reference to the accompanied drawings:

A. Configuration of Printing System
B. Halftoning Process in First Embodiment
B-1. First Modified Example of First Embodiment
B-2. Second Modified Example of First Embodiment
B-3. Third Modified Example of First Embodiment
C. Halftoning Process in Second Embodiment
C-1. First Modified Example of Second Embodiment
C-2. Second Modified Example of Second Embodiment
C-3. Third Modified Example of Second Embodiment
C-4. Fourth Modified Example of Second Embodiment
D. Other Aspects

A. Configuration of Printing System

Figure 1:
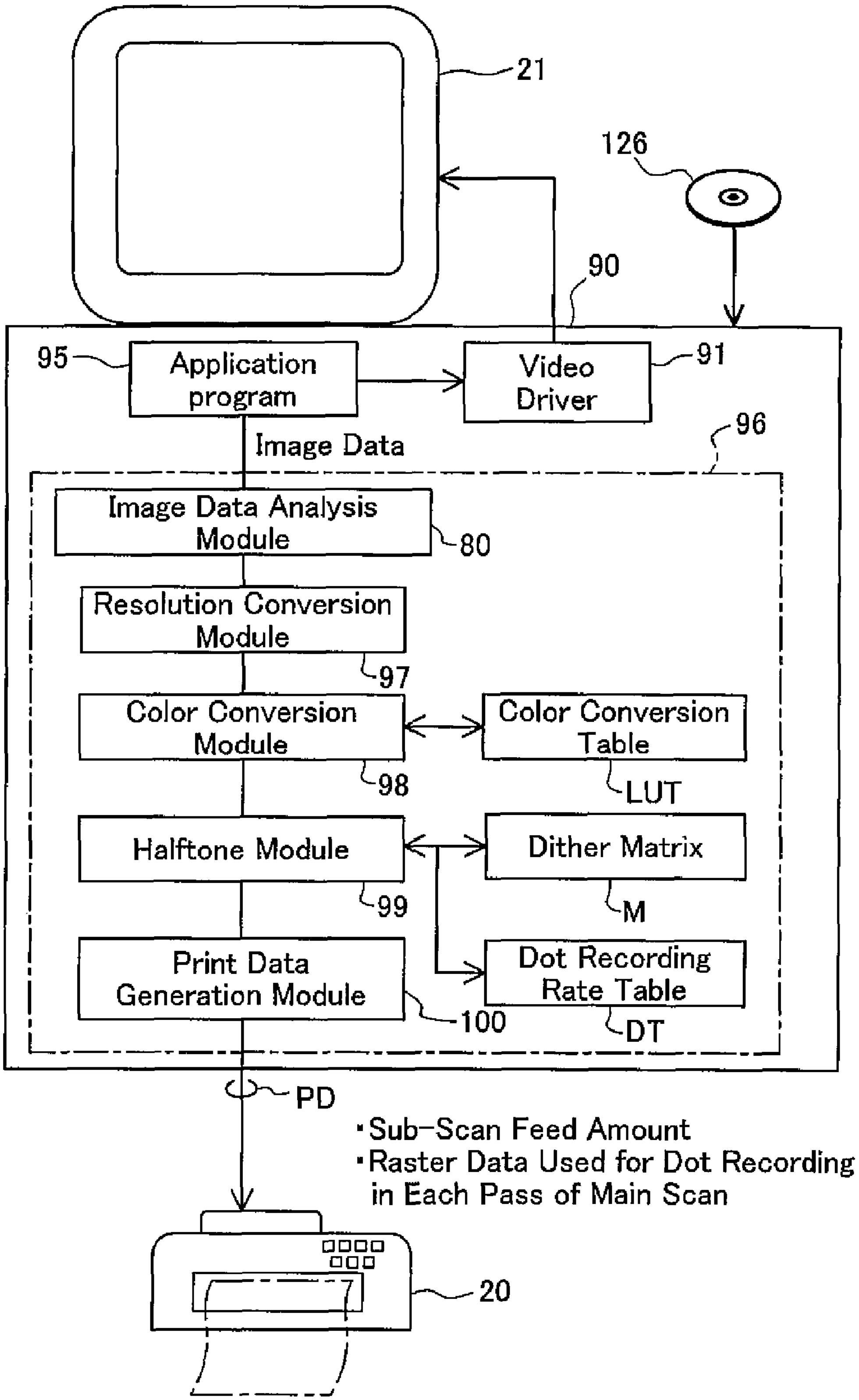
FIG. 1 is a block diagram showing the schematic configuration of a printing system.

FIG. 1 is a block diagram showing the schematic configuration of a printing system. The printing system includes a computer 90 functioning as a print controller and a color printer 20 functioning as a printing assembly. The combination of the color printer 20 with the computer 90 is a 'printing device' in the broad sense.

In the computer 90, an application program 95 works under a predetermined operating system. A video driver 91 and a printer driver 96 are incorporated in the operating system. The application program 95 supplies image data to the printer driver 96. The printer driver 96 processes the supplied image data and generates and outputs print data PD, which is to be transferred to the color printer 20. The application program 95 performs a desired series of image processing on an image specified as a processing object and displays the image on a CRT 21 via the video driver 91.

The printer driver 96 includes an image data analysis module 80, a resolution conversion module 97, a color conversion module 98, a halftone module 99, a print data generation module 100, a color conversion table LUT, and a dot recording rate table DT. The image data analysis module 80 analyzes the image data supplied from the application program 95 and identifies an image type with regard to each set of image data or each image area expressed by the image data. The resolution conversion module 97 converts the resolution of an input image into a printing resolution. The color conversion module 98 makes color conversion from an RGB color system to a CMYK color system. The halftone module 99 uses a dither matrix (produced as described later) for color subtraction to convert input tone values into output tone values expressible by dot creation as halftone data. The print data generation module 100 generates print data to be transmitted to the color printer 20 from the halftone data. The color conversion table LUT is referred to by the color conversion module 98 as a color conversion base. The dot recording rate table DT is referred to determine the recording rate of each size dot for halftoning.

The printer driver 96 is equivalent to a program having the function of generating the print data PD. The program for the function of the printer driver 96 may be recorded in a computer readable recording medium. Typical examples of such a recording medium include a CD-ROM 126, a flexible disk, a magneto-optical disk, an IC card, a ROM cartridge, a punched card, a print with a barcode or another code printed thereon, an internal storage device (memories like a RAM and a ROM) and an external storage device of the computer, and diversity of other computer readable media.

Figure 2:
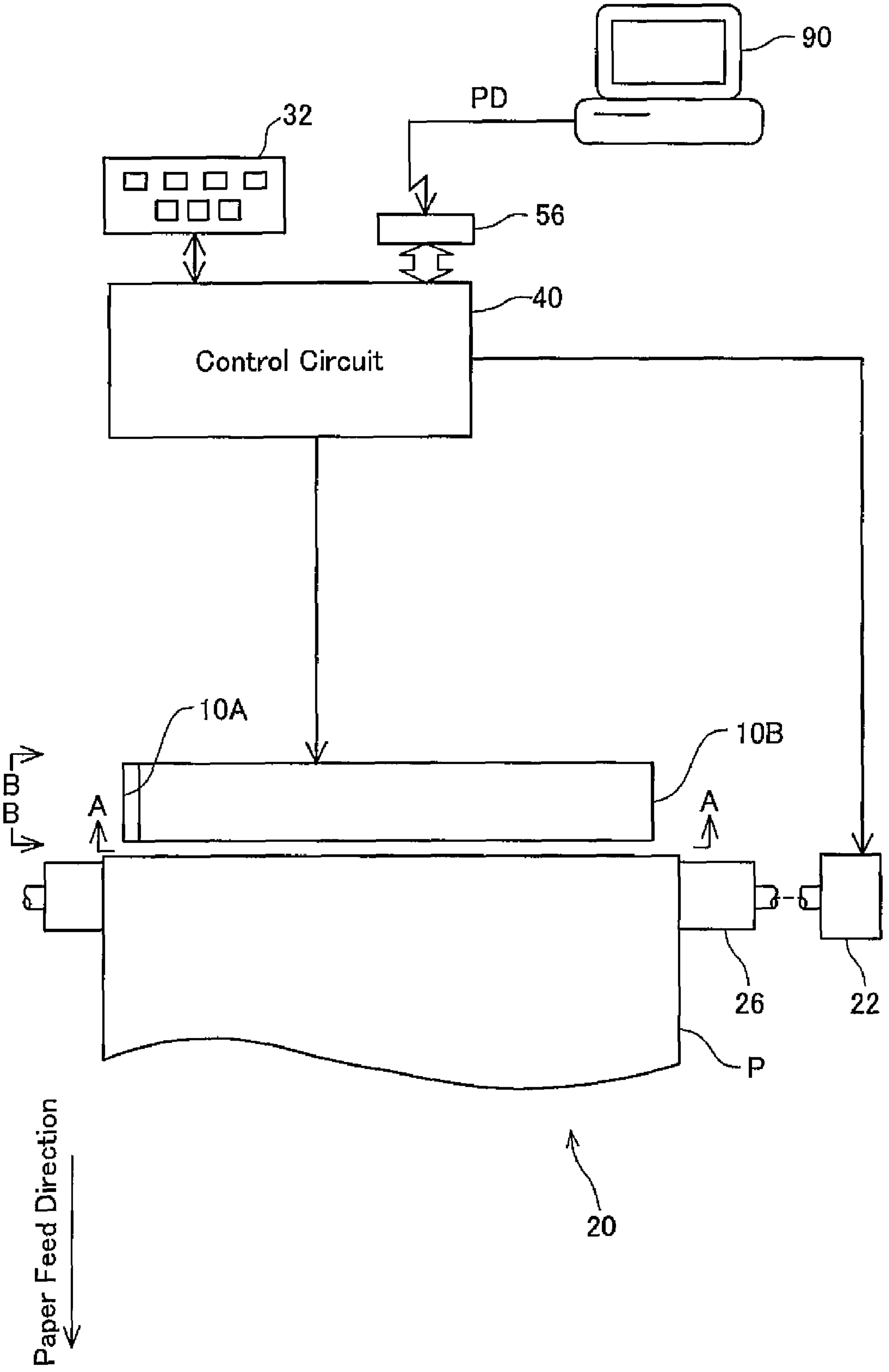
FIG. 2 illustrates the schematic structure of a color printer included in the printing system of FIG. 1.

FIG. 2 illustrates the schematic structure of the color printer 20. The color printer 20 has an operation panel 32, a paper feed motor 22, a paper feed driving mechanism structured to feed a printing medium P in a paper feed direction by means of the paper feed motor 22, and a control circuit 40 configured to drive print heads 10A and 10B and control ink ejection and dot creation. The control circuit 40 is connected to the computer 90 via a connector 56. There are no main scans of the print heads 10A and 10B in the color printer 20.

The inventors of the present application have confirmed image degradation due to a vibration caused in the direction of paper width during a scan or feed of the printing paper P in the paper feed direction by the paper feed motor 22 and have analyzed the mechanism of image degradation as discussed later.

Figure 3:
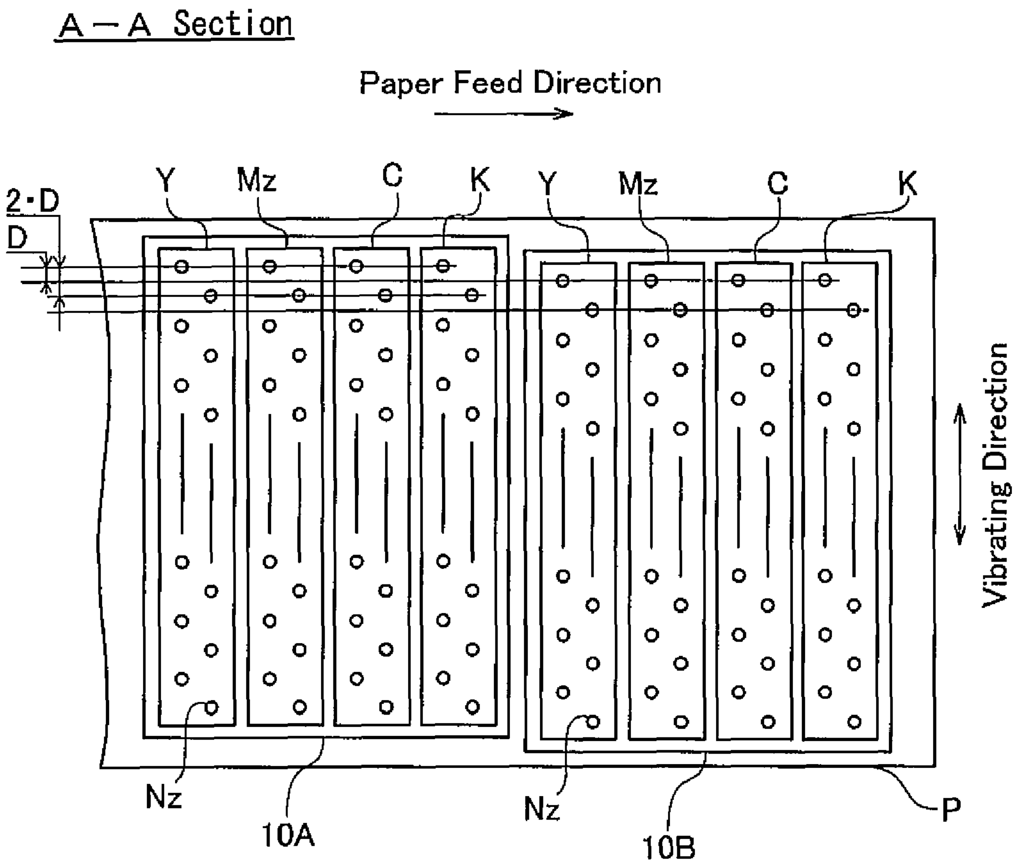
FIG. 3 shows a nozzle arrangement on a lower face of two print heads.

FIG. 3 shows a nozzle arrangement on the lower face of the print heads 10A and 10B, taken on the line A-A in FIG. 2. A black ink nozzle array K for ejection of black ink, a cyan ink nozzle array C for ejection of cyan ink, a magenta ink nozzle array Mz for ejection of magenta ink, and a yellow ink nozzle array Y for ejection of yellow ink are provided on the lower face of each of the print heads 10A and 10B.

Multiple nozzles Nz in each nozzle array are arranged at a fixed nozzle pitch k□D in the direction of paper width perpendicular to the paper feed direction. Here k denotes an integral multiple, and D denotes a dot pitch corresponding to a printing resolution in the direction of paper width. In the specification hereof, the nozzle pitch may be expressed by 'k dots'. In this expression, the unit of 'dot' represents the dot pitch of the printing resolution. The paper feed amount may also be expressed in the unit of 'dot'.

The nozzle pitch k is set to 2 for each of the nozzle arrays C, Mz, Y, and K of the two print heads 10A and 10B. The two print heads 10A and 10B are arranged to be shifted by the nozzle pitch k in the direction of paper width (zigzag alignment). This zigzag alignment of the two print heads 10A and 10B ensures ejection of each color ink without causing any blank in pixels. This zigzag alignment corresponds to the 'mutually zigzag position' in the claims of the invention. The 'mutually zigzag position' may include three positions mutually shifted by the nozzle pitch k that is not less than 3.

Figure 4:
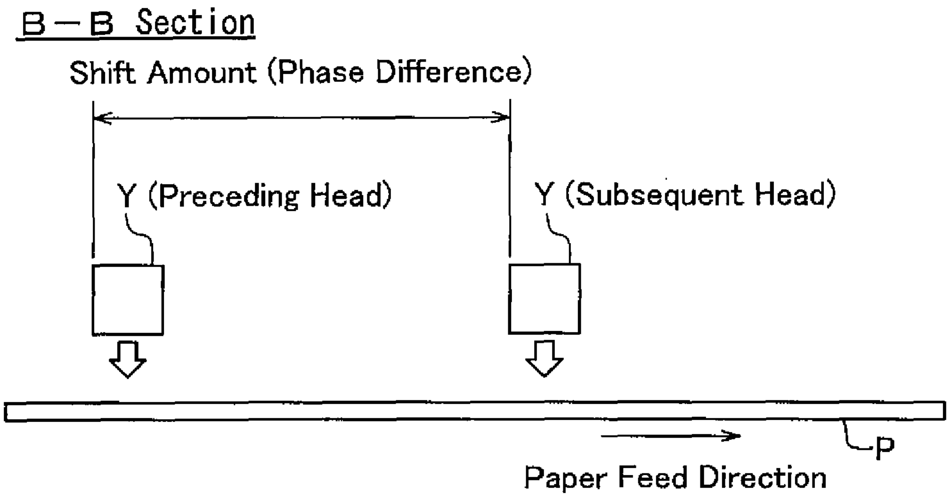
FIG. 4 shows a side face of the two print heads.

FIG. 4 shows the side face of the print heads 10A and 10B, taken on the line B-B in FIG. 2. For the better understanding of explanation, only the nozzle array Y for ejection of yellow ink is shown in FIG. 4. In the state of FIG. 4, while the printing medium P is fed in the paper feed direction shown by the arrow, the print heads 10A and 10B eject ink droplets at positions shifted in this paper feed direction (scanning direction).

Figure 5:
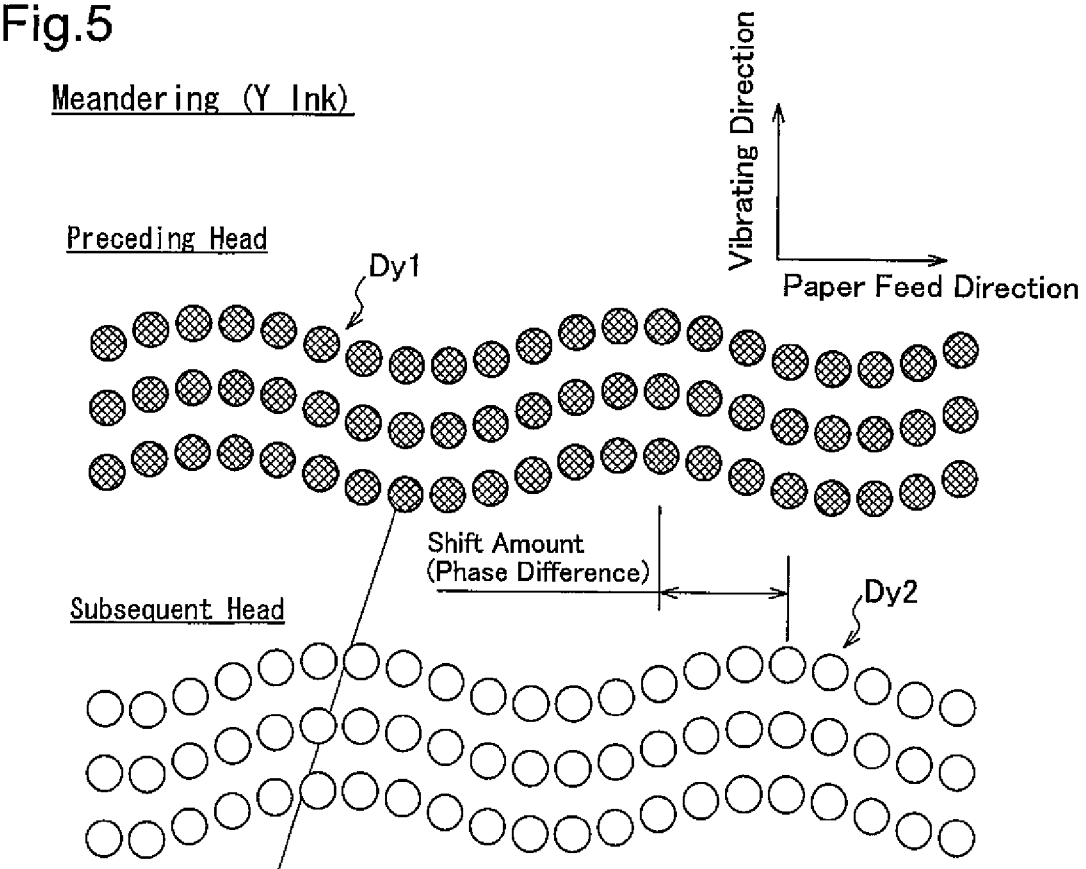
FIG. 5 shows a mechanism of image degradation caused by a meandering scan.
Figure 6:
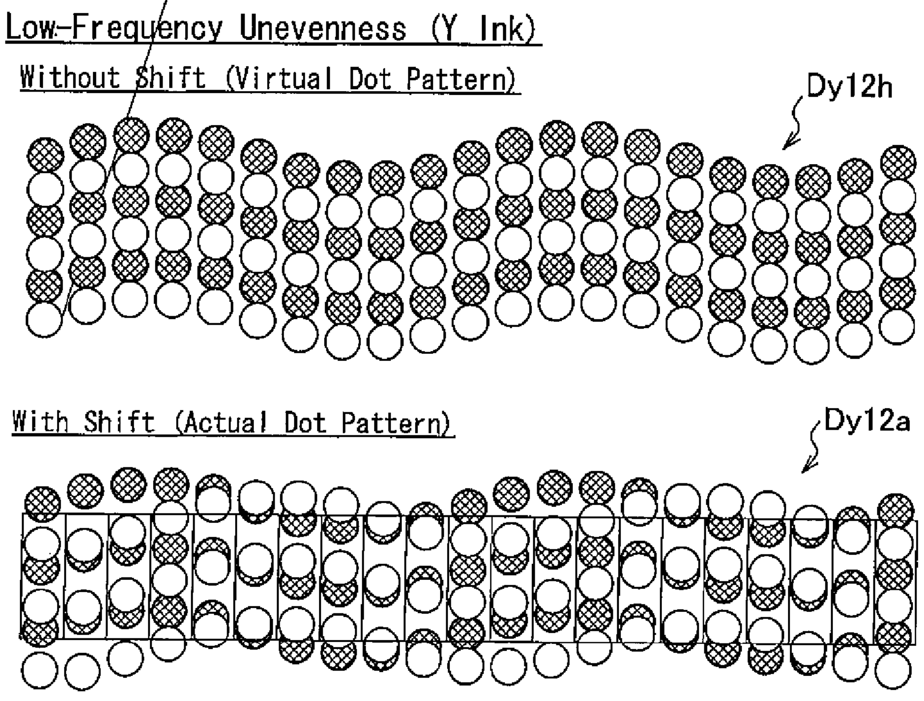
FIG. 6 shows the mechanism of image degradation caused by the meandering scan.

FIGS. 5 and 6 show a mechanism of image degradation caused by a meandering scan. FIG. 5 shows a dot pattern Dy1 formed by the yellow ink nozzle array Y of the preceding head 10A and a dot pattern Dy2 formed by the yellow ink nozzle array Y of the subsequent head 10B. As clearly understood from FIG. 5, these two dot patterns Dy1 and Dy2 have an identical waveform with a phase shift. The identical waveform is ascribed to the feed of the printing medium P relative to the two fixed print heads 10A and 10B at 'a fixed paper feed amount' and with a 'fixed vibration'. The phase shift is ascribed to a shift of the yellow ink nozzle array Y provided in each of the two print heads 10A and 10B in the paper feed direction. The shift amount of FIG. 5 is equal to the shift amount of FIG. 4.

FIG. 6 shows a virtual dot pattern Dy12*h* formed by combining the two dot patterns Dy1 and Dy2 without a shift and an actual dot pattern Dy12*a* formed by combining the two dot patterns Dy1 and Dy2 with a shift. As clearly shown in FIG. 6, the relative positional relation of respective dot groups of the two dot patterns Dy1 and Dy2 is kept in the virtual dot pattern Dy12*h* to fix the mutual contact state of the dot groups. In the actual dot pattern Dy12*a*, on the other hand, the relative positional relation of the respective dot groups of the two dot patterns Dy1 and Dy2 is not kept to vary the mutual contact state of the dot groups in the paper feed direction.

The conventional approach reduces the vibration to prevent image degradation as disclosed in Japanese Patent Laid-Open No. H08-217302. The inventors of the present application, however, have developed a completely new approach, which is essentially different from the conventional direct approach of reducing the vibration as the cause of image degradation. The new approach takes particular note of the relation of the image type to image degradation and prevents the image degradation based on the cause-and-effect relation between the vibration and the image degradation.

The inventors of the present application focused attention on the low potential for image degradation caused by a meandering scan in the 'image having a narrow printing area like letters' or the 'photographic image having a high frequency' and the high potential for image degradation in the 'image having a wide printing area and a low frequency like a solid image'. The inventors of the present application also focused attention on the fact that the 'image having the wide printing area and the low frequency like the solid image' has the low frequency of image quality and is thus not significantly affected by a decrease in printing resolution. The inventors of the present application have completed the technique of preventing image degradation caused by the mutual interference of the two dot patterns Dy1 and Dy2, based on these two completely different factors.

Figure 7:
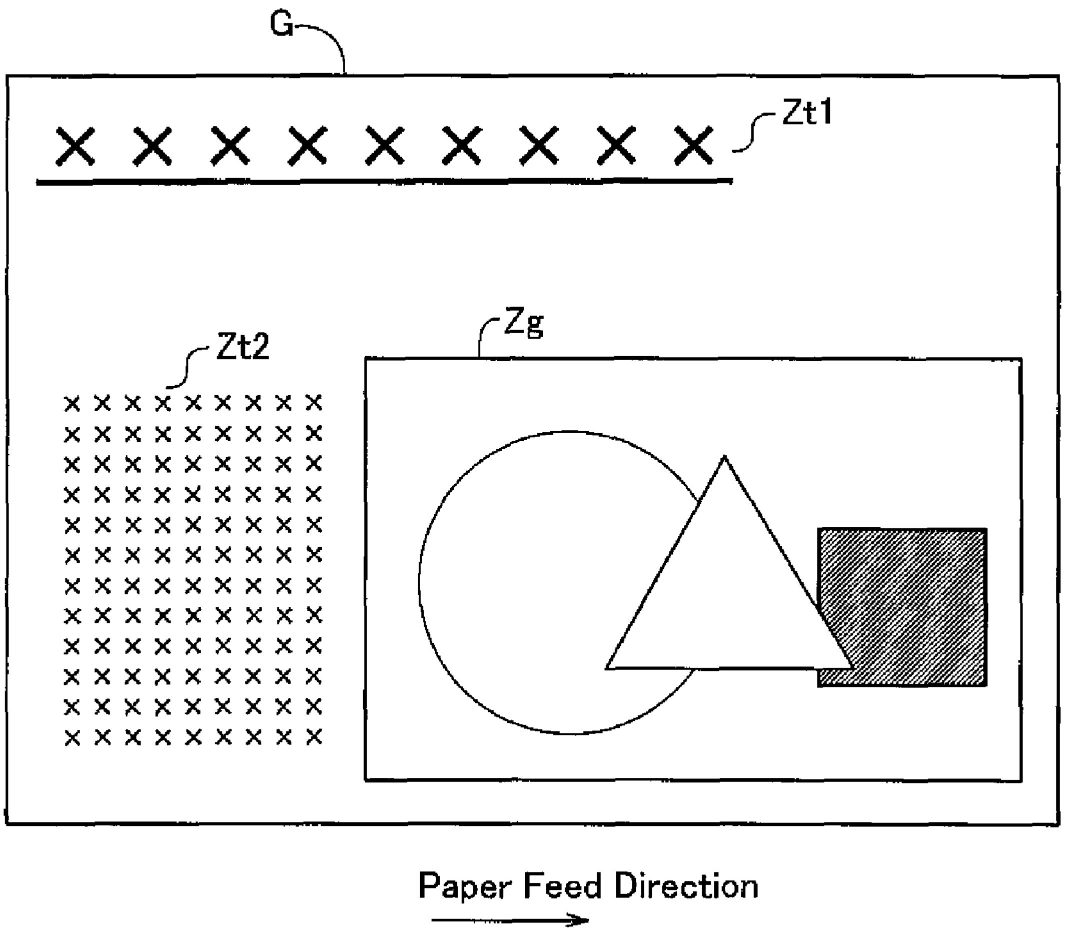
FIG. 7 shows a print image G as an object of an image degradation control process in a first embodiment.

FIG. 7 shows a print image G as an object of an image degradation control process in a first embodiment. The print image G includes two text areas Zt1 and Zt2 and one graphic area Zg. The image data analysis module 80 (FIG. 1) analyzes and classifies image data representing the print image G. The analysis classifies image data of the two text areas Zt1 and Zt22 as 'text areas' and image data of the graphic area Zg as a 'graphic area'.

Figure 8:
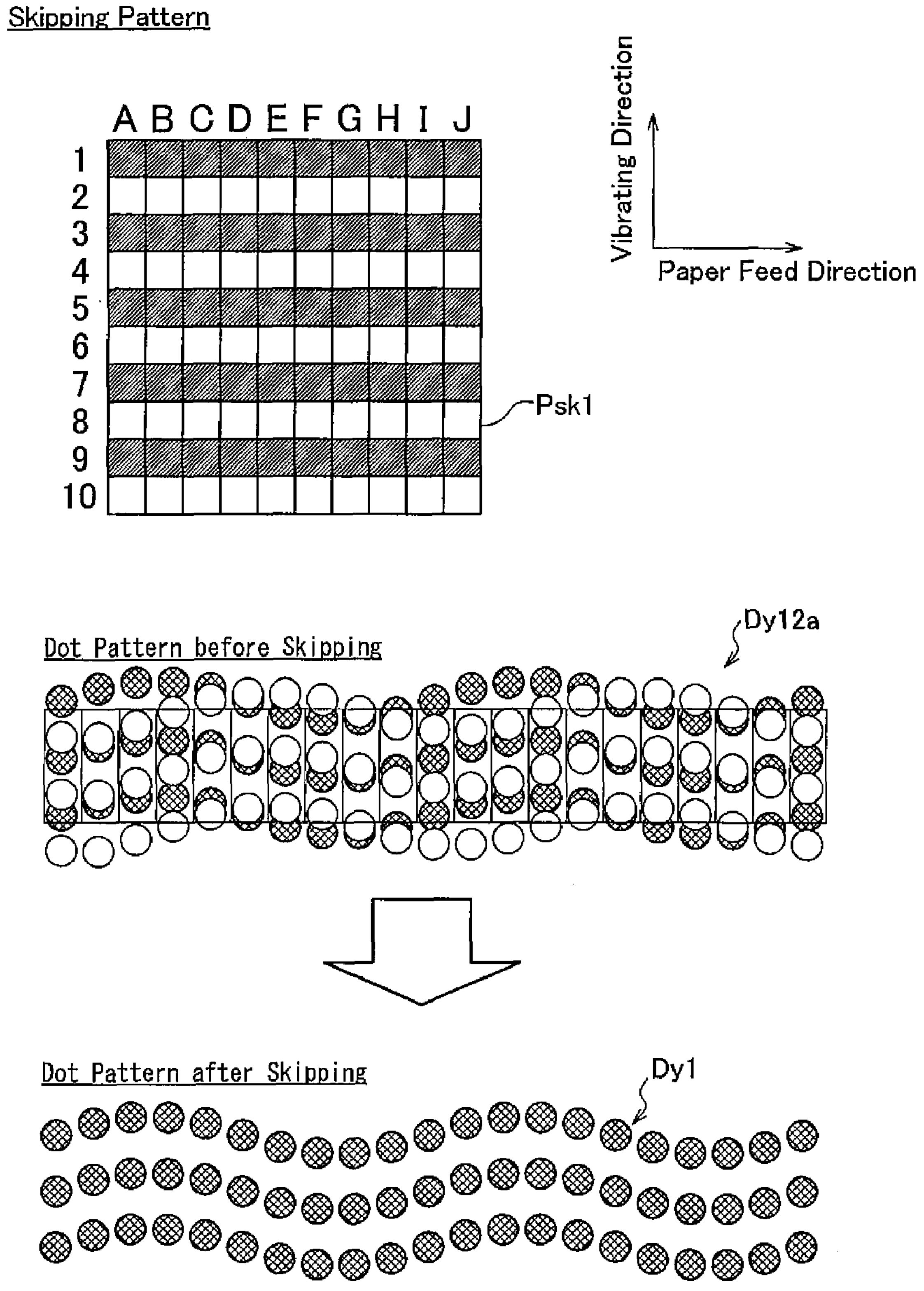
FIG. 8 shows a skipping pattern adopted in the image degradation control process of the first embodiment and two dot patterns before and after skipping.

FIG. 8 shows a skipping pattern Psk1 adopted in the image degradation control process of the first embodiment and two dot patterns Dy12*a* and Dy1 before and after skipping. The skipping pattern Psk1 deletes dots in pixel rows having even row numbers (non-hatched pixel groups), while leaving dots in pixel rows having odd row numbers (hatched pixel groups). The dot pattern Dy12*a* and the dot pattern Dy1 before and after skipping are respectively equivalent to the dot pattern Dy12*a* shown in FIG. 6 and the dot pattern Dy1 shown in FIG. 5.

The image degradation control process of the first embodiment applies the skipping pattern Psk1 on the dot pattern Dy12*a* to form the dot pattern Dy1 for the pixel rows having the odd row numbers and form the dot pattern Dy2 for the pixel rows having the even row numbers. Skipping the dot pattern Dy2 from the dot pattern Dy12*a* leaves the dot pattern Dy1 and eliminates the image degradation caused by the mutual interference of the dot pattern Dy1 with the dot pattern Dy2. The details of such image degradation control are described below.

B. Halftoning Process in First Embodiment

Figure 9:
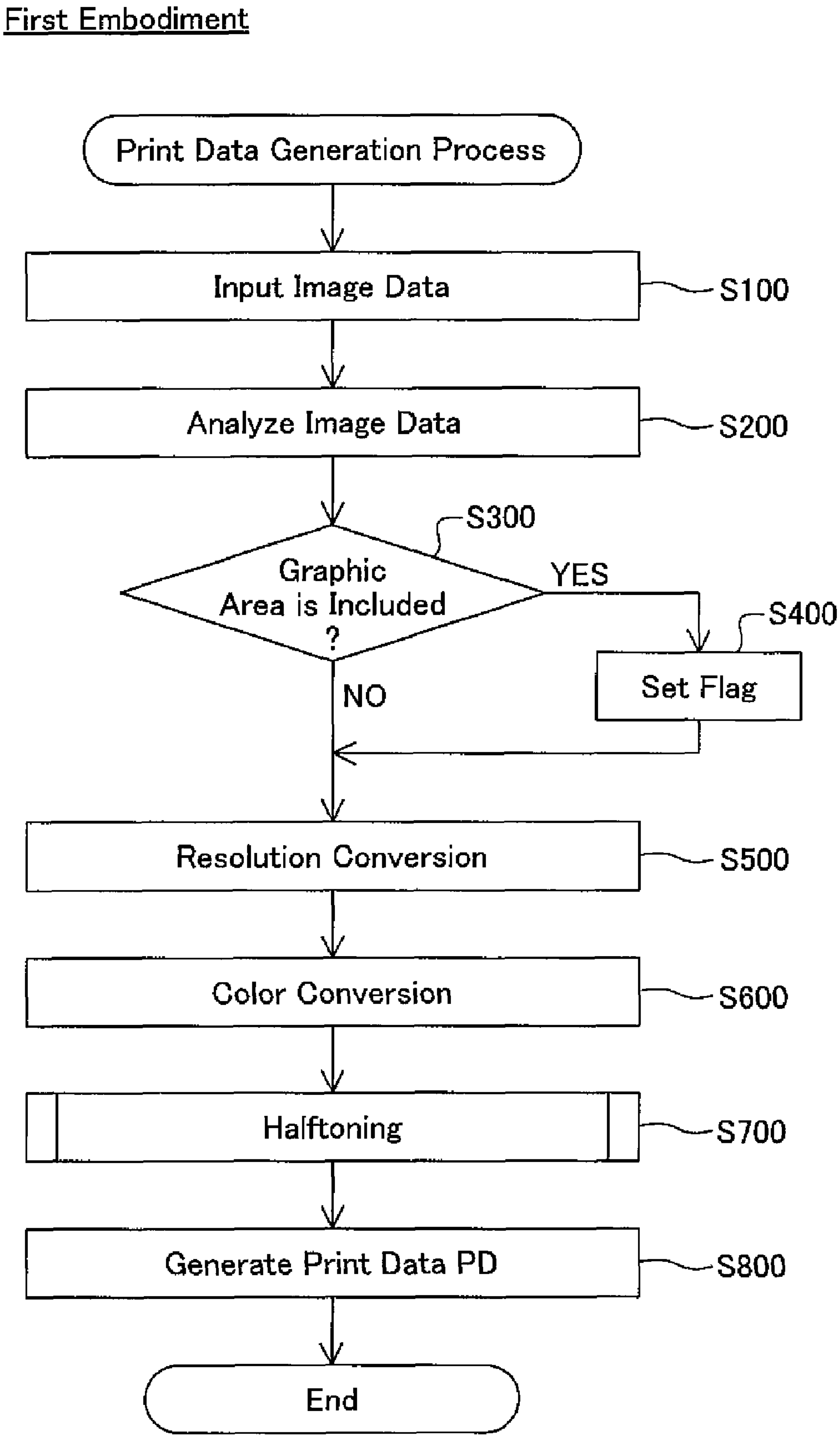
FIG. 9 is a flowchart showing a print data generation routine executed in the first embodiment.

FIG. 9 is a flowchart showing a print data generation routine performed in the first embodiment of the invention. The print data generation routine is executed by the computer 90 to generate print data PD, which is to be supplied to the color printer 20.

At step S100, the printer driver 96 (FIG. 1) inputs image data from the application program 95, in response to a print command given by the application program 95. For example, the image data represents the print image G (FIG. 7) and includes attribute information of respective image areas At step S200, the image data analysis module 80 (FIG. 1) identifies each image area of the input image data as a 'test area', a 'photographic area', or a 'graphic area'. When the input image data does not include any image area identified as the 'graphic area' according to the result of analysis, the processing flow goes to step S500. When the input image data includes any image area identified as the 'graphic area' according to the result of analysis, on the other hand, the processing flow goes to step S400.

At step S400, the image data analysis module 80 sets a predetermined flag in the image area identified as the 'graphic area'. The flag is set for each image area and is utilized in a halftoning process described later.

At step S500, the resolution conversion module 97 converts the input image data into RGB bitmap data and converts the resolution of the input image data (that is, the number of pixels per unit length) into a predetermined resolution.

At step S600, the color conversion module 98 refers to the color conversion table LUT (FIG. 1) and converts the RGB bitmap data into multi-tone data of ink colors available in the color printer 20 with regard to each pixel.

At step S700, the halftone module 99 performs the halftoning process. The halftoning process of this embodiment reduces 256 tones as the number of tones of the multi-tone data to the number of tones expressible in each pixel by the color printer 20, while performing a predetermined correction process (skipping process). After the halftoning process, the print data generation module 100 generates print data PD at step S800.

Figure 10:
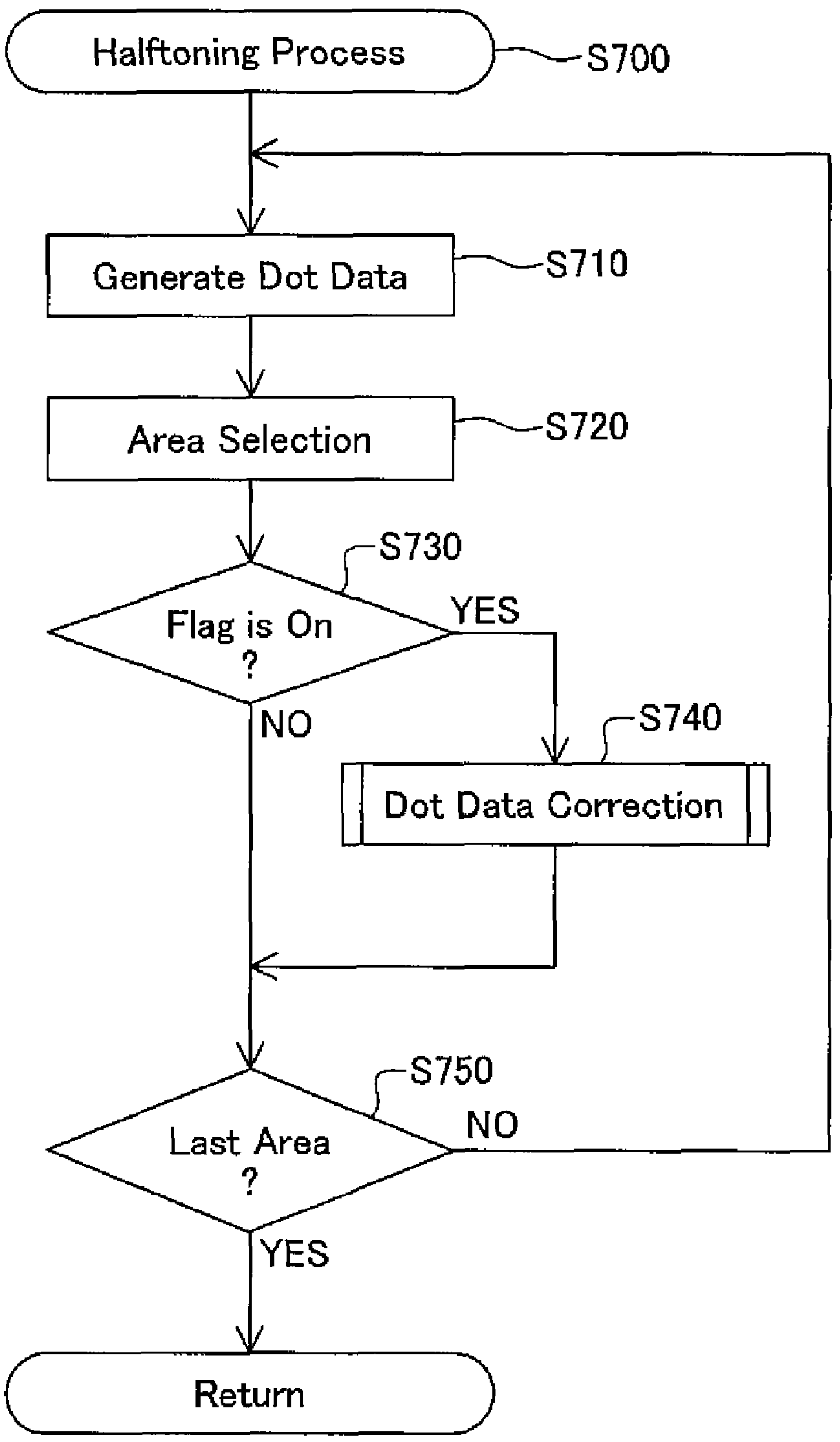
FIG. 10 is a flowchart showing the details of a halftoning process executed in the print data generation routine of FIG. 9.

FIG. 10 is a flowchart showing the details of the halftoning process performed in the first embodiment. At step S710, the halftone module 99 performs a dot data generation process. The dot data generation process generates data representing the dot creation state in each pixel. The dot creation state in each pixel is expressed by two tones 'dot-off state' and 'dot-on state' in this embodiment.

At step S720, the halftone module 99 performs an area selection process. For example, the area selection process sequentially selects areas of dot data corresponding to the two text areas Zt1 and Zt2 and the graphic area Zg included in the print image G (FIG. 7).

At step S730, the halftone module 99 determines whether the predetermined flag is set (flag-on condition or flag-off condition) in each selected area. In the flag-off condition, the processing flow goes to step S750 to complete the halftoning process. In the flag-on condition, on the other hand, the processing flow goes to step S740.

At step S740, the halftone module 99 performs a dot data correction process. The dot data correction process applies the skipping pattern Psk1 (FIG. 8) to dot data of the selected area.

Figure 11:
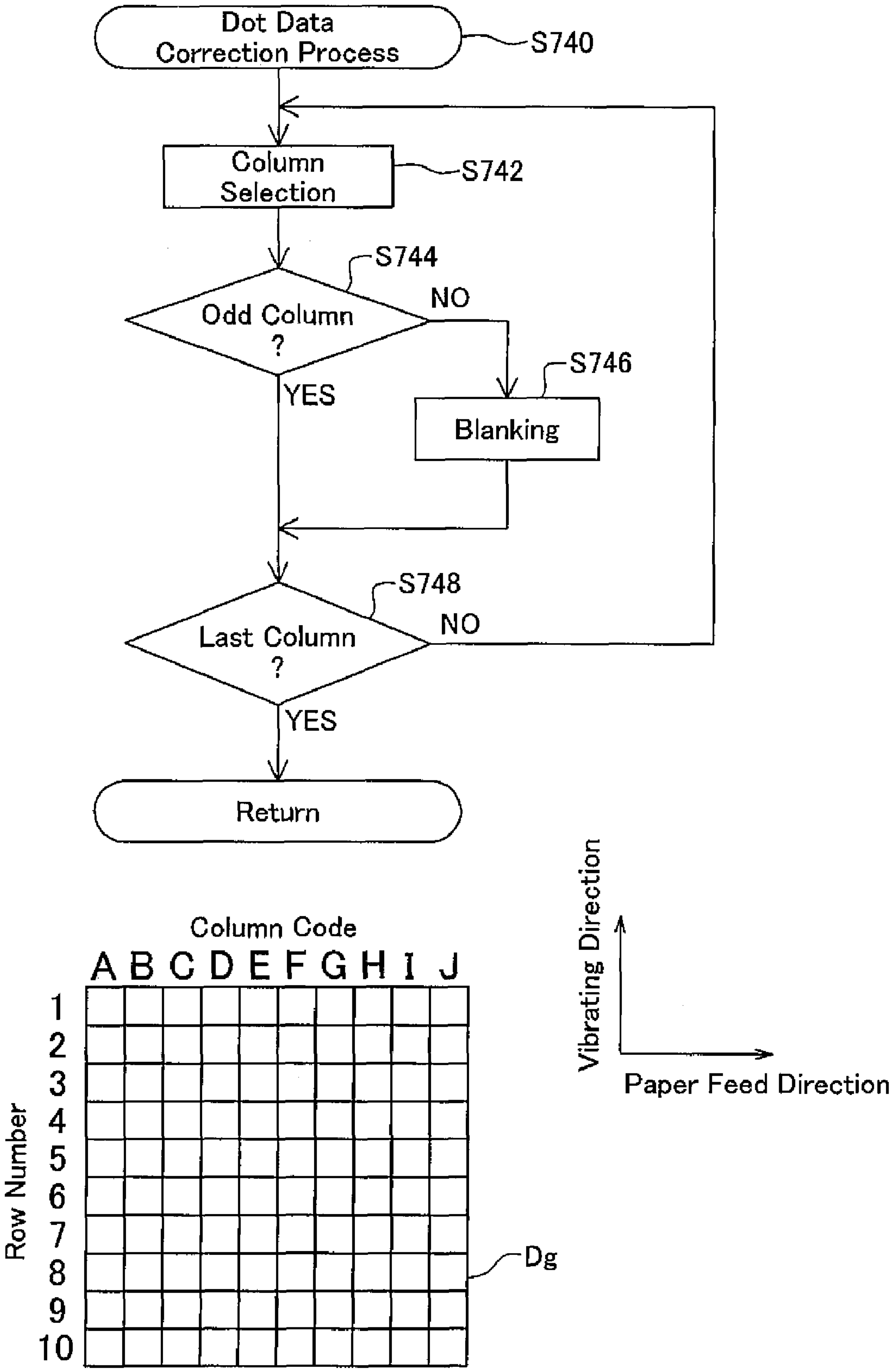
FIG. 11 is a flowchart showing the details of a dot data correction process executed in the halftoning process of FIG. 10 with a pixel group Dg of a selected area.

FIG. 11 is a flowchart showing the details of the dot data correction process performed in the first embodiment with a pixel group Dg of the selected area. At step S742, the halftone module 99 performs a column selection process. The column selection process sequentially selects a pixel column or a set of pixels aligned in parallel to the paper feed direction from a row number 1 in the pixel group Dg of the selected area.

At step S744, the halftone module 99 identifies whether the row number of the selected pixel column is an odd number or an even number. In the case of an odd row number, the processing flow goes to step S748 to complete the dot data correction. In the case of an even row number, on the other hand, the processing flow goes to step S746.

At step S746, the halftone module 99 performs a blank process. The blank process changes dot data of all pixels in the selected column to the 'dot-off state'.

The processing of steps S742 to S746 is repeated until the processing object reaches a last column in the selected area. This series of processing skips the dot pattern Dy2 from the dot pattern Dy12*a* and leaves the dot pattern Dy1. Such skipping effectively prevents image degradation caused by mutual interference of the two dot patterns Dy1 and Dy2. Although the above explanation regards the individual processing for each selected area, image data including only text areas or image data including only graphic areas may be collectively processed.

B-1. First Modified Example of First Embodiment

Figure 12:
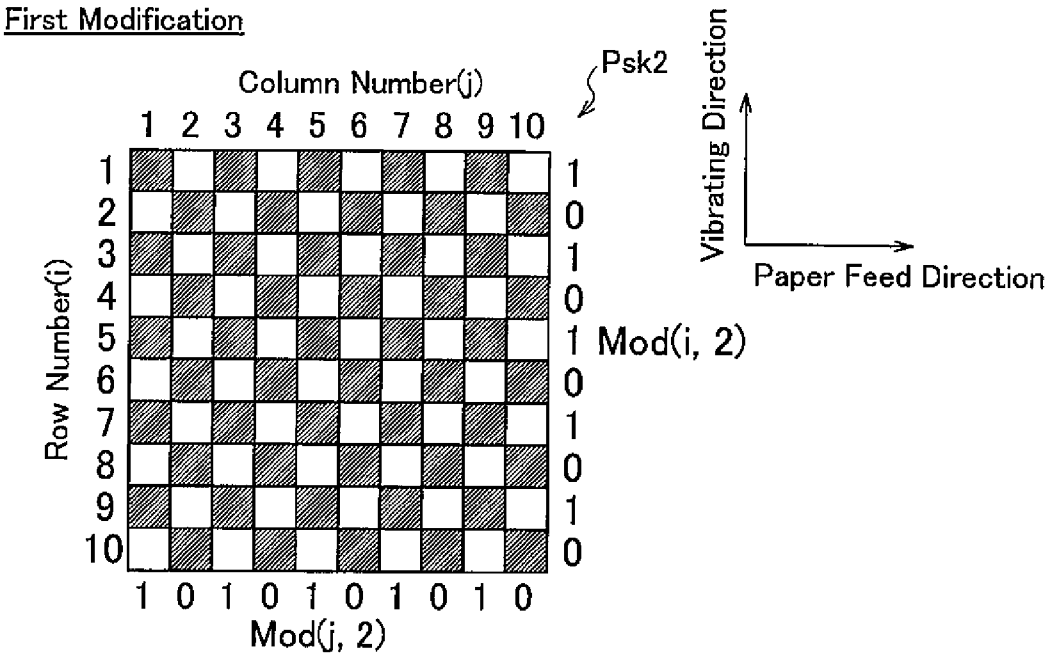
FIG. 12 shows a skipping pattern and the details of a dot skipping process in a first modified example of the first embodiment.
Figure 12:
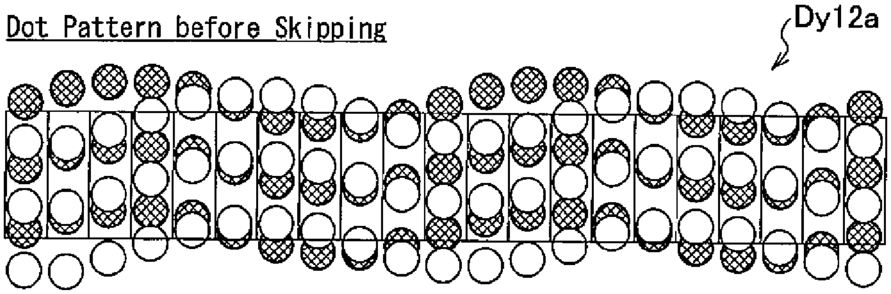
Figure 12:
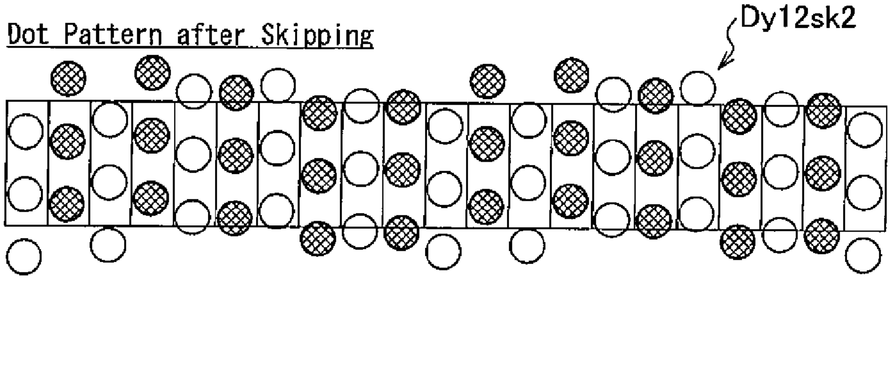

FIG. 12 shows a skipping pattern Psk2 and the details of a dot skipping process in a first modified example of the first embodiment. The skipping pattern Psk2 is designed to skip dots in a checkered pattern to prevent succession of dots in a vibrating direction. Application of this skipping pattern Psk2 forms a dot pattern Dy12*sk*2. As clearly shown in the dot pattern Dy12*sk*2, such skipping reduces the potential for dot contact in the vibrating direction and effectively prevents mutual interference of the dot pattern Dy1 with the dot pattern Dy2.

Figure 13:
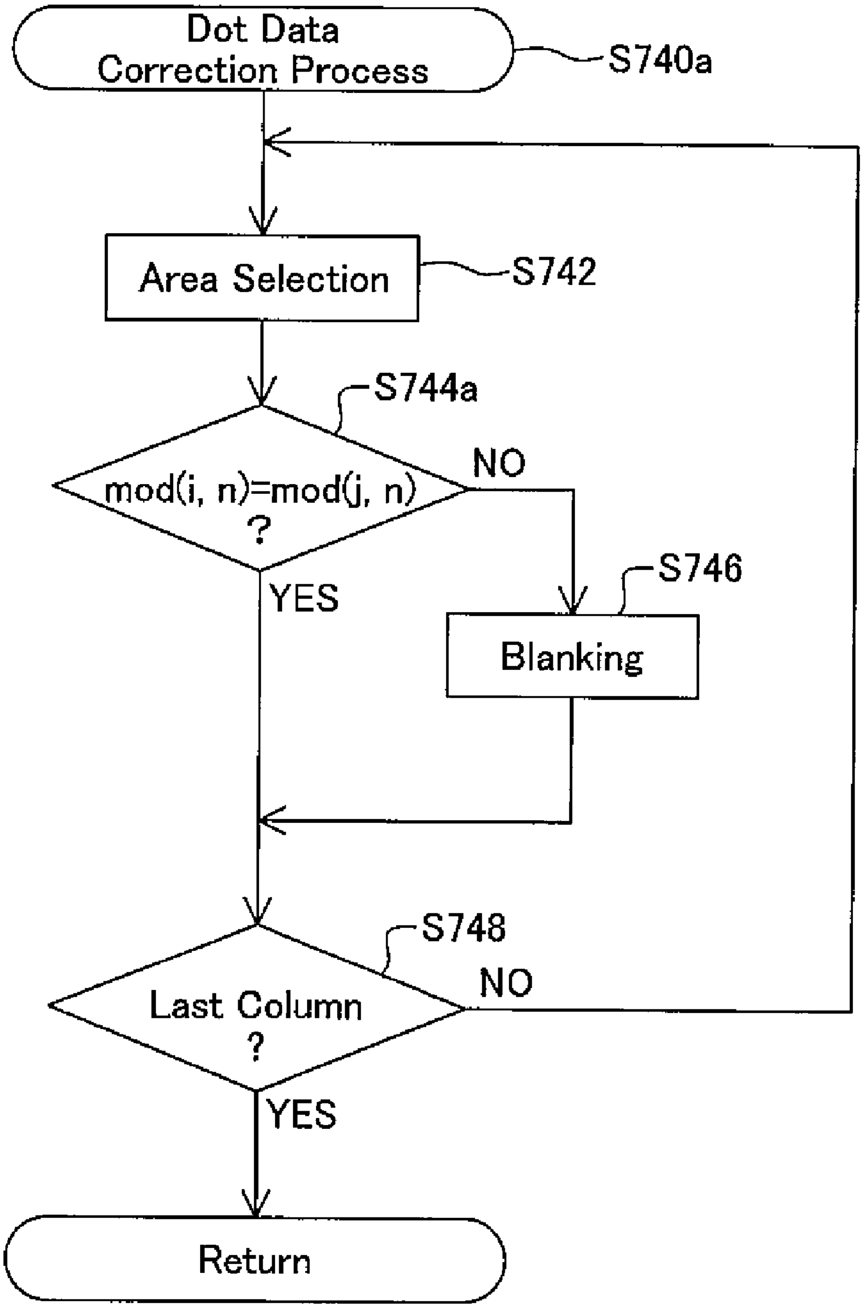
FIG. 13 is a flowchart showing the details of a dot data correction process executed in the first modified example of the first embodiment.

FIG. 13 is a flowchart showing the details of a dot data correction process executed in the first modified example of the first embodiment. The dot pattern correction process of the first modified example has step S744*a*, in place of step S744 in the dot correction process of the first embodiment shown in FIG. 11. The processing of step S744*a* applies the skipping pattern Psk2 (FIG. 13), in place of the skipping pattern Psk1 (FIG. 8), to skip dots.

A function Mod(i,n) in a calculation equation at step S744*a* divides a row number i by a parameter n and specifies a remainder of the division. Similarly a function Mod(j,n) in the calculation equation divides a column number j by the parameter n and specifies a remainder of the division.

Figure 14:
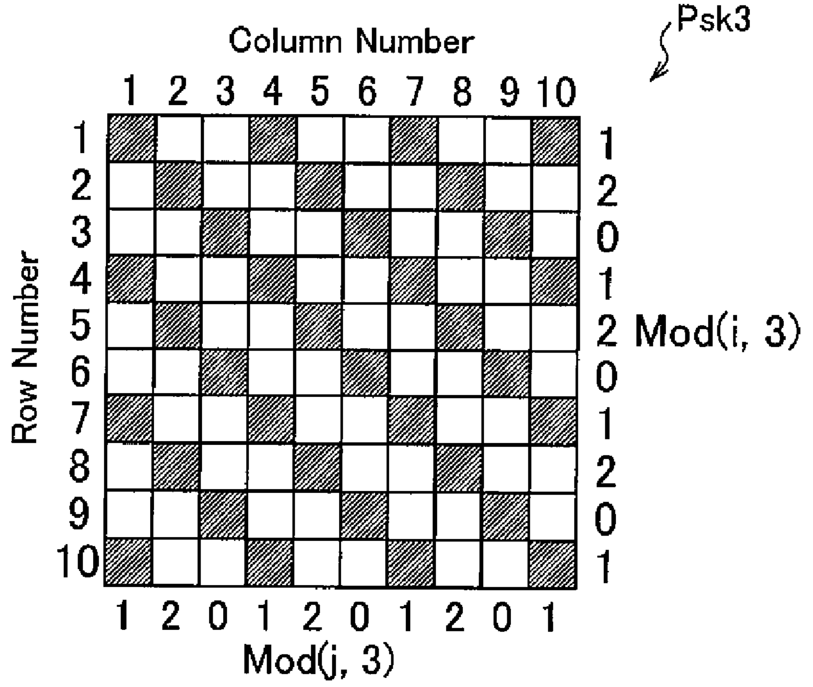
FIG. 14 shows another skipping pattern applicable in the first modified example of the first embodiment.

Skipping either the dot pattern Dy1 or the dot pattern Dy2 is not essential to prevent the mutual interference of the two dot patterns Dy1 and Dy2. Any skipping pattern may be adopted to give a dot pattern with no dot succession in the vibrating direction. A skipping pattern Psk3 shown in FIG. 14 is applicable for this purpose. The skipping pattern Psk3 is adoptable at step S744*a* in the flowchart of FIG. 13 with setting the parameter n equal to 3 in the two functions Mod (i,n) and Mod(j,n).

B-2. Second Modified Example of First Embodiment

Figure 15:
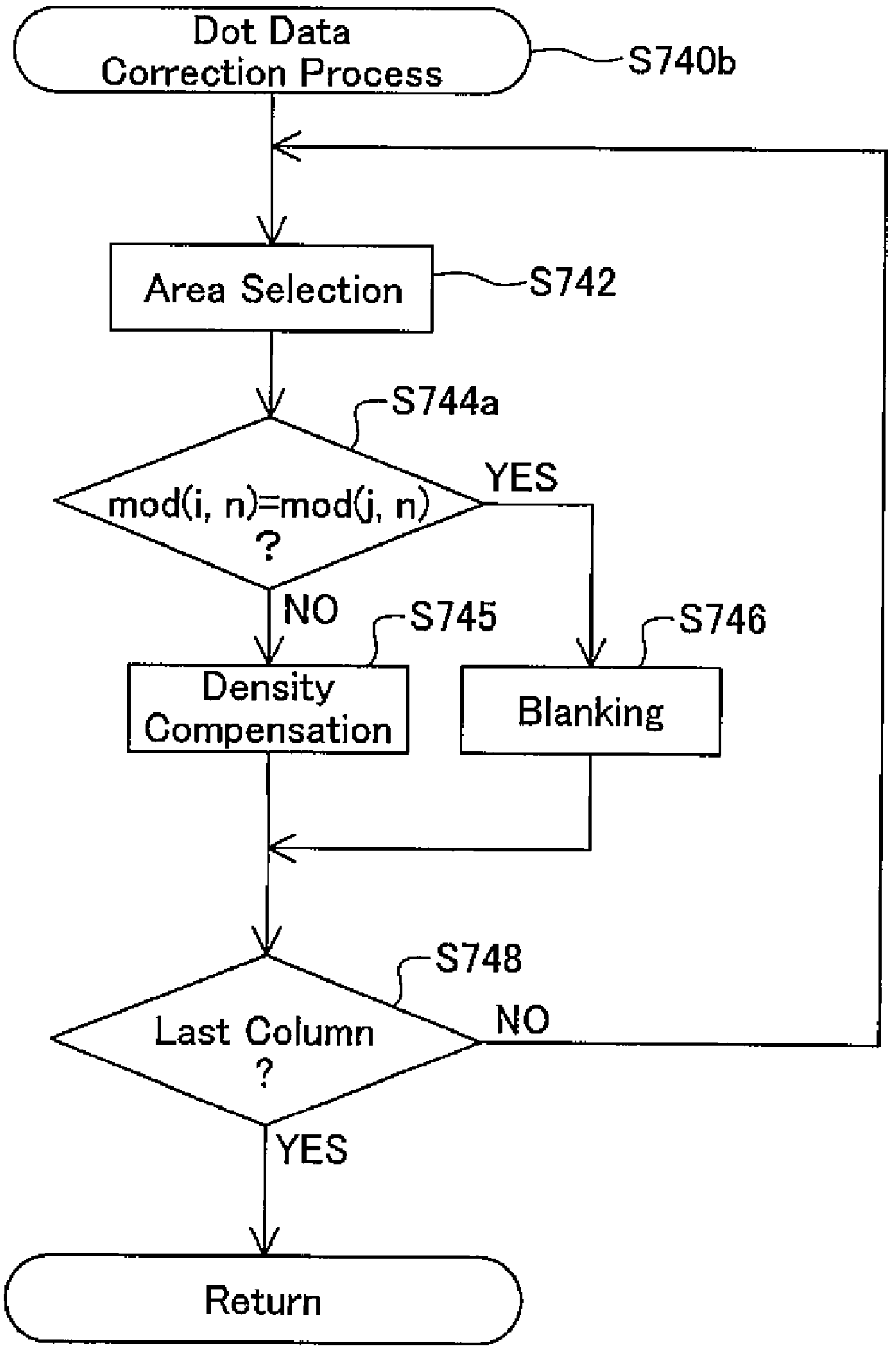
FIG. 15 is a flowchart showing the details of a dot data correction process executed in a second modified example of the first embodiment.

FIG. 15 is a flowchart showing the details of a dot data correction process executed in a second modified example of the first embodiment. The different of the dot data correction process of the second modified example from the dot data correction process of the first embodiment shown in FIG. 13 is additional step S745. At step S745, the halftone module 99 performs a density compensation process. The density compensation process increases the quantity of ink of non-skipped dots, in order to compensate for the ink density decreased by the dot skipping. The density compensation has the significant effect especially on application of a skipping pattern having a high skipping ratio (a ratio of the number of pixels as skipping targets to the total number of pixels) like the skipping pattern Psk3 shown in FIG. 14.

B-3. Third Modified Example of First Embodiment

The first embodiment and its modified examples described above skip dots in a regular manner according to a preset rule. The regular dot skipping is, however, not essential. Dot skipping may be performed at random or may be performed in a virtual manner as explained below in a subsequent second embodiment. In the specification hereof the terminology 'skipping' is used in a broad sense and includes simple change of dot formation positions without decreasing the ink density of dots or the number of dots (as described in the second embodiment).

C. Halftoning Process in Second Embodiment

Figure 16:
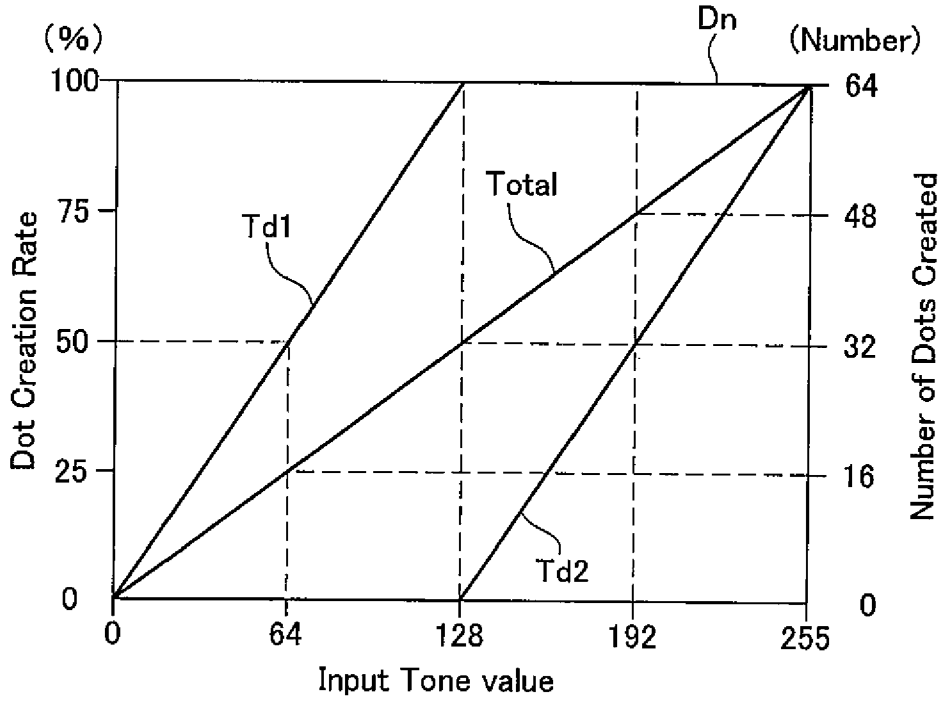
FIG. 16 shows the principle of a halftoning process of a second embodiment to prevent image degradation due to mutual interference of two dot patterns.

FIG. 16 shows the principle of a halftoning process of the second embodiment to prevent image degradation due to mutual interference of the two dot patterns Dy1 and Dy2. Unlike the procedure of the first embodiment, the procedure of the second embodiment does not perform the dot skipping but adjusts the dot creation sequence by the dither method to prevent mutual interference of the two dot patterns Dy1 and Dy2.

A dot position allocation matrix AL and a dot number allocation table Dn are shown in FIG. 16. The dot position allocation matrix AL has a first pixel group with a pixel value equal to '1' and a second pixel value with a pixel value equal to '2'. Allocation of pixels into these two pixel groups is determined to prevent succession of dots in the vibrating direction. The first pixel group and the second pixel group are designed to prevent independent succession of dots in the vibrating direction. Namely there is no dot succession in the vibrating direction unless dots are created in both the first pixel group and the second pixel group. There is accordingly no mutual interference of two dot patterns caused by misalignment of dots in the vibrating direction unless dots are created in both the first pixel group and the second pixel group.

The dot number allocation table Dn is used to determine allocation of target dot-on numbers in the first pixel group and in the second pixel group at each input tone value. The abscissa shows the input tone value in the range of 0 to 255 (256 tones), while the ordinate shows the dot creation rates (left vertical axis) in the respective pixel groups and the total number of dots to be created (right vertical axis) in pixels. The relation of the dot creation rate in the first pixel group to the input tone value is expressed by a curve Td1. The relation of the dot creation rate in the second pixel group to the input tone value is expressed by a curve Td2. The total number of dots to be created in pixels is expressed by a curve Total.

For example, at an input tone value of 0, no dot is created in either of the two pixel groups. At an input tone value of 64, the dot creation rate in the first pixel group, the dot creation rate in the second pixel group, and the total number of dots to be created in pixels are respectively equal to 50%, 0%, and 16 dots. Namely dots are created in 16 pixels, which are 50% of the total 32 pixels in the first pixel group, whereas no dot is created in the second pixel group. The total number of dots to be created in pixels is thus equal to 16.

At an input tone value of 128, the dot creation rate in the first pixel group, the dot creation rate in the second pixel group, and the total number of dots to be created in pixels are respectively equal to 100%, 0%, and 32 dots. Namely dots are created in all 32 pixels, which are 100% of the total 32 pixels in the first pixel group, whereas no dot is created in the second pixel group. The total number of dots to be created in pixels is thus equal to 32.

At an input tone value of 192, the dot creation rate in the first pixel group, the dot creation rate in the second pixel group, and the total number of dots to be created in pixels are respectively equal to 100%, 50%, and 48 dots. Namely dots are created in all 32 pixels, which are 106% of the total 32 pixels in the first pixel group, whereas dots are created in 16 pixels, which are 50% of the total 32 pixels in the second pixel group. The total number of dots to be created in pixels is thus equal to 48.

The dot creation rate is converted into level data having, for example, 256 stages in the range of 0 to 255. Comparison between the level data and threshold values in a dither matrix M determines the dot on-off state. The dot creation rate of the second embodiment represents the ratio of dot creation as a whole, irrespective of the pixel group. The input tone value having the 256 tones in the range of 0 to 255 is thus linearly converted into level data having the 256 stages in the range of 0 to 255.

Figure 17:
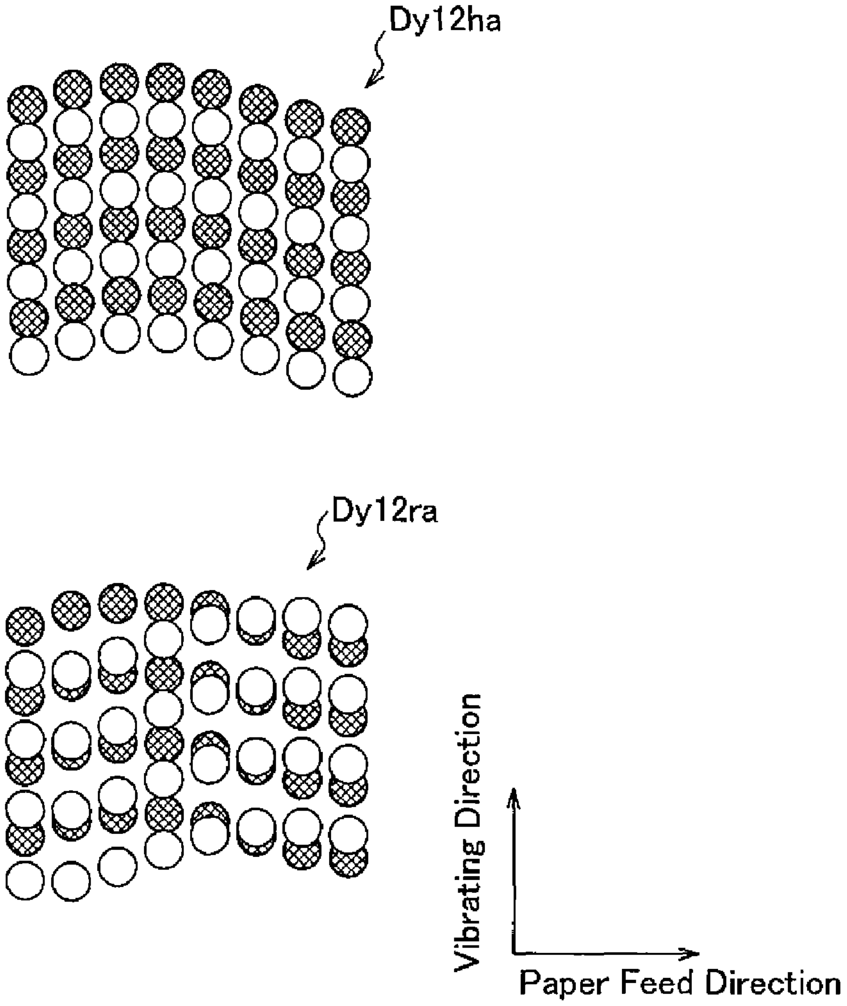
FIG. 17 shows prevention of image degradation due to mutual interference of two dot patterns by the halftoning process of the second embodiment.
Figure 17:
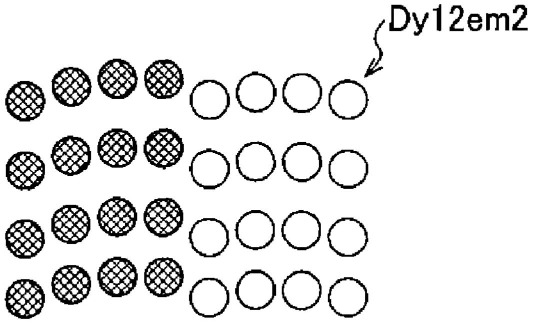

FIG. 17 shows prevention of image degradation due to mutual interference of the two dot patterns Dy1 and Dy2 by the halftoning process of the second embodiment. Two dot patterns Dy12*ha* and Dy12*ra* show sets of dots created in all the pixels corresponding to the dot position allocation matrix AL (FIG. 16). The dot pattern Dy12*ha* is an extraction of dots created in the pixels corresponding to the dot position allocation matrix AL from the dot pattern Dy12*h* (see FIG. 6). The dot pattern 12*ra* is an extraction of dots created in the pixels corresponding to the dot position allocation matrix AL from the dot pattern Dy12*a* (see FIG. 6).

A dot pattern Dy12*em*2 represents a set of dots (dot group) created in all the pixels of the first pixel group. The hatched 16 dots are created in the pixels having the pixel value of '1' in odd rows of the $1^{st}$ through the $4^{th}$ columns in the dot position allocation matrix AL. The non-hatched 16 dots are created in the pixels having the pixel value of '1' in even rows of the $5^{th}$ through the $8^{th}$ columns in the dot position allocation matrix AL. The dot pattern Dy12*em*2 shows a dot creation state at the input tone value of 128 in the dot number allocation table Dn. In this state, 32 dots are created in all the 32 pixels of the first pixel group.

The halftoning process of the second embodiment is performed with a dither matrix M adjusted for dot allocation based on the dot position allocation matrix AL and the dot number allocation table Dn (FIG. 16). The following description first regards the basic configuration of the halftoning process with a dither matrix.

Figures 18, 19:
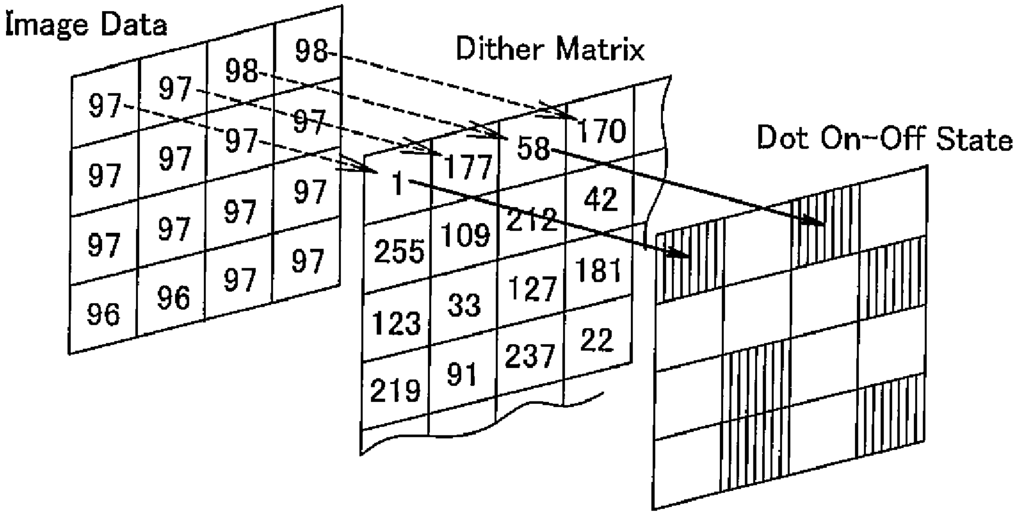
FIG. 18 conceptually shows part of a dither matrix.
FIG. 19 shows determination of a dot on-off state based on the dither matrix.

FIG. 18 conceptually shows part of a dither matrix. In the illustrated dither matrix, threshold values evenly selected over the tone value range of 1 to 255 are stored in a total of 16384 elements, which are 256 elements in a lateral direction (main scanning direction) by 64 elements in a vertical direction (sub-scanning direction). The size of the dither matrix is not restricted to these dimensions of FIG. 18 but may be set arbitrarily including those having an identical number of elements in both the lateral and the vertical directions.

FIG. 19 shows determination of the dot on-off state based on the dither matrix. As a matter of convenience, only part of elements is shown in FIG. 19. The procedure of determining the dot on-off state compares a tone value of image data in a pixel with a threshold value stored at a corresponding position in the dither matrix. When the tone value of the image data in the pixel is greater than the threshold value stored at the corresponding position in the dither matrix, a dot is to be created in the pixel (dot-on state). When the tone value of the image data is smaller than the threshold value at the corresponding position in the dither matrix, on the other hand, no dot is to be created in the pixel (dot-off state). The hatched rectangles in FIG. 19 represent pixels in the dot-on state.

Determination of the dot on-off state in each pixel having the preset tone value of image data is mainly based on the threshold value set at the corresponding position in the dither matrix. The systematic dither method allows active control of the dot creation state according to the storage position of threshold values in the dither matrix. The procedure of the second embodiment takes advantage of this characteristic of the dither matrix to perform the dot allocation based on the dot position allocation matrix AL and the dot number allocation table Dn (FIG. 16).

Figure 20:
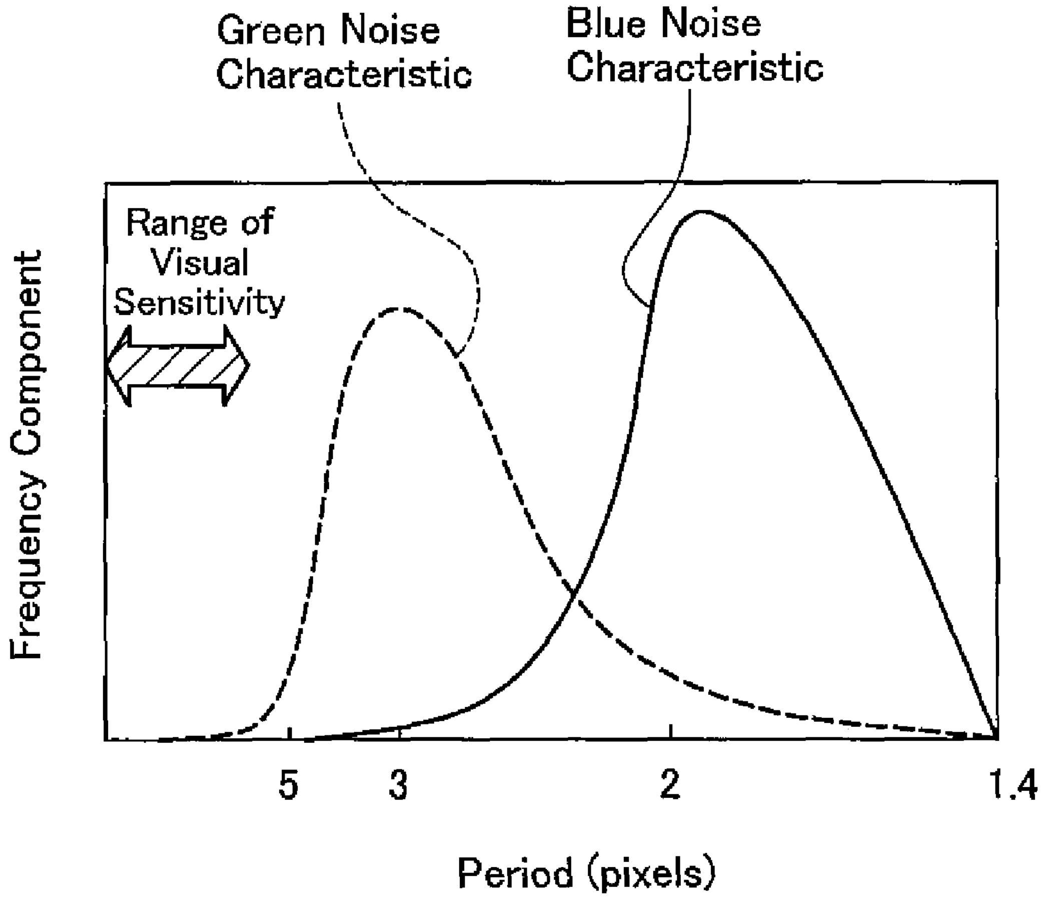
FIG. 20 conceptually shows a spatial frequency characteristic of threshold values set at respective pixel positions in a blue noise dither matrix having a blue noise characteristic as a simple example of adjustment of a dither matrix.

FIG. 20 conceptually shows a spatial frequency characteristic of threshold values set at respective pixel positions in a blue noise dither matrix having a blue noise characteristic as a simple example of adjustment of the dither matrix. The spatial frequency characteristic of the blue noise matrix has a maximum frequency component in a high frequency domain having the length of one period approximate to 2 pixels. This spatial frequency characteristic is set by taking into account the human visual feature. Namely the blue noise dither matrix has threshold values stored at respective storage positions adjusted to ensure the occurrence of a maximum frequency component in a high frequency domain by considering the low sensitivity of the human vision in the high frequency domain.

A broken-line curve in FIG. 20 shows the spatial frequency characteristic of a green noise matrix. The spatial frequency characteristic of the green noise matrix has a maximum frequency component in a medium frequency domain having the length of one period in a range of 2 pixels to ten odd pixels. The green noise matrix has threshold values set to have such a spatial frequency characteristic. Determination of the dot on-off state in each pixel according to the dither matrix having the green noise characteristic accordingly creates blocks of dots adjacent in the unit of several dots and dispersedly arranges these blocks of dots as a whole. In printers having difficulty in stable creation of fine dots of a one-pixel size level like laser printers, application of the blue noise matrix to determination of the dot on-off state effectively prevents the occurrence of isolated dots and thereby ensures high-speed output of a stable-quality image. Namely the dither matrix referred to for determination of the dot on-off state in the laser printers has threshold values adjusted to have the green noise characteristic.

Figure 21:
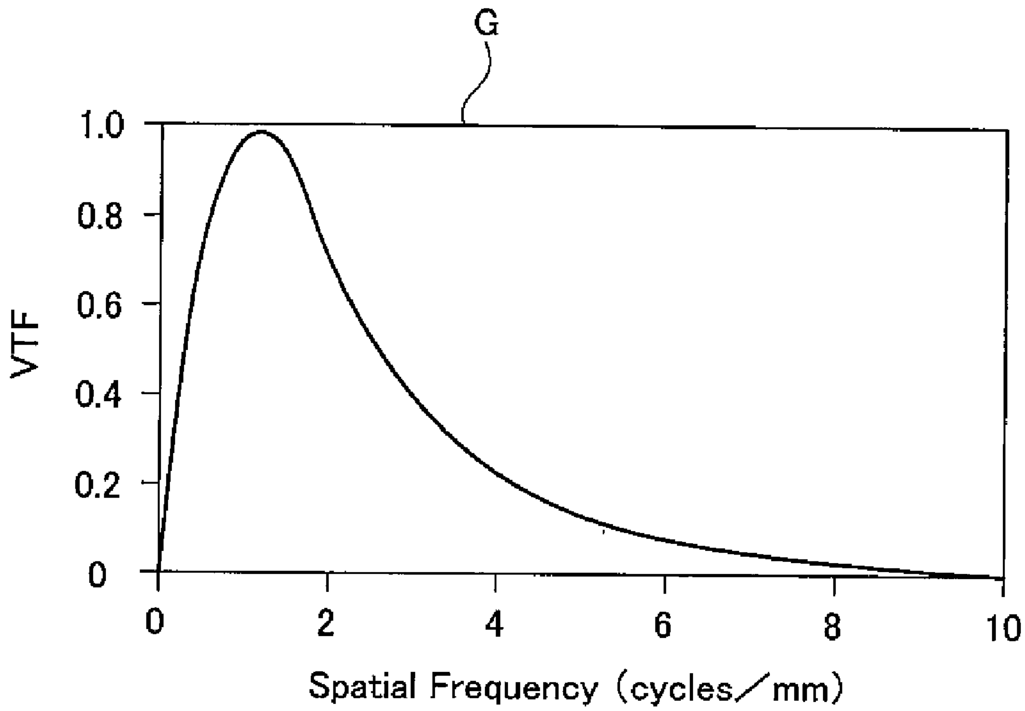
FIG. 21 conceptually shows a spatial frequency characteristic VTF (visual transfer function) of vision as the human visual sensitivity characteristic to the spatial frequency.

FIG. 21 conceptually shows a spatial frequency characteristic VTF (visual transfer function) of vision as the human visual sensitivity characteristic to the spatial frequency. The human visual sensitivity is simulated by utilizing the spatial frequency characteristic VTF of vision. Such simulation allows quantification of the granularity of dots to the human vision after the halftoning process. The quantified value is referred to as a granularity index. A function F1 shows a typical experimental equation representing the spatial frequency characteristic VTF of vision. A variable L and a variable u in the function F1 respectively denote a distance of observation and a spatial frequency. A function F2 defines the granularity index. A coefficient K in the function F2 is used to make the obtained value suited to the human sensitivity.

Such quantification of the granularity of dots to the human vision enables the dither matrix to be finely optimized to the human vision. Fourier transform of a dot pattern expected by application of the dither matrix to the respective input tone values gives a power spectrum FS. The granularity index obtained by integrating the product of the power spectrum Fs and the spatial frequency characteristic VTF of vision over the whole range of input tone value (Function F2) is used as an evaluation function of the dither matrix. Adjustment of the storage positions of the respective threshold values to minimize the evaluation function of the dither matrix optimizes the dither matrix.

The common characteristic of the blue noise matrix and the green noise matrix designed by taking into account the human visual feature is setting a small average value of frequency components in a preset low frequency domain from 0.5 cycles per millimeter to 2 cycles per millimeter about 1 cycle per millimeter on the center as the spatial frequency domain of the highest human visual sensitivity on the printing medium. For example, the average value of frequency components in the preset low frequency domain is made at least smaller than an average value of frequency components in a specific range from 5 cycles per millimeter to 20 cycles per millimeter about 1 cycles per millimeter on the center having the human visual sensitivity substantially equal to zero. As is confirmed by the inventors of the present application, such setting desirably reduces the granularity of dots in a specific frequency domain having the high human visual sensitivity and effectively improves the image quality of a resulting printed image by taking advantage of the human visual sensitivity.

Figure 22:
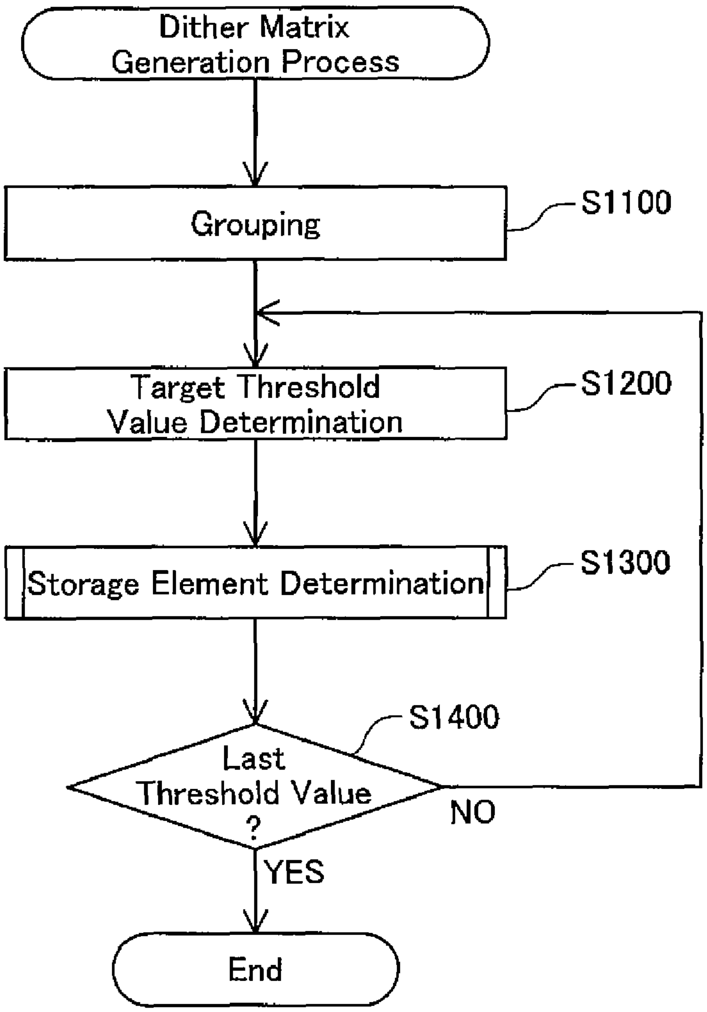
FIG. 22 is a flowchart showing a processing routine of dither matrix generation in the second embodiment.

FIG. 22 is a flowchart showing a processing routine of dither matrix generation in the second embodiment. For the simplicity of explanation, the following description regards generation of a small 8 rows□8 columns dither matrix M corresponding to the dot position allocation matrix AL (FIG. 16). The granularity index (Function F2 in FIG. 21) is utilized for evaluation of the optimality of the dither matrix.

Figure 23:
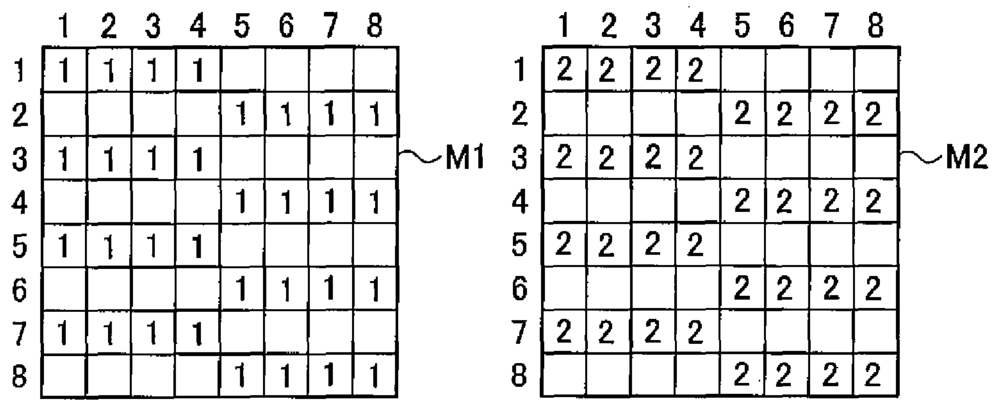
FIG. 23 shows two divisional matrices M1 and M2 obtained by dividing a dither matrix M of the second embodiment.

A grouping process is performed at step S1100. The grouping process divides the small 8 rows□8 columns dither matrix M into two divisional matrices M1 and M2 (see FIG. 23). The divisional matrix M1 corresponds to the first pixel group (having the pixel value '1' in FIG. 16), and the divisional matrix M2 corresponds to the second pixel group (having the pixel value '2' in FIG. 16).

A target threshold value determination process is performed at step S1200. The target threshold value determination process specifies a target threshold value as an object of determination of a storage element. The procedure of the embodiment sequentially selects threshold values in an ascending order, that is, in a descending order of dot creation potential, to determine the target threshold value. Such sequential selection of threshold values in the descending order of dot creation potential leads to fixation of storage elements in a sequence of threshold values having the higher control effect on dot allocation in a highlight image area having the high prominence of dot granularity. This ensures the larger degree of design freedom in the highlight image area having the high prominence of dot granularity.

A storage element determination process is performed at step S1300. The storage element determination process specifies an element at which the target threshold value is stored. The target threshold value determination process (step S1200) and the storage element determination process (step S1300) are alternately repeated to generate a dither matrix.

Figure 24:
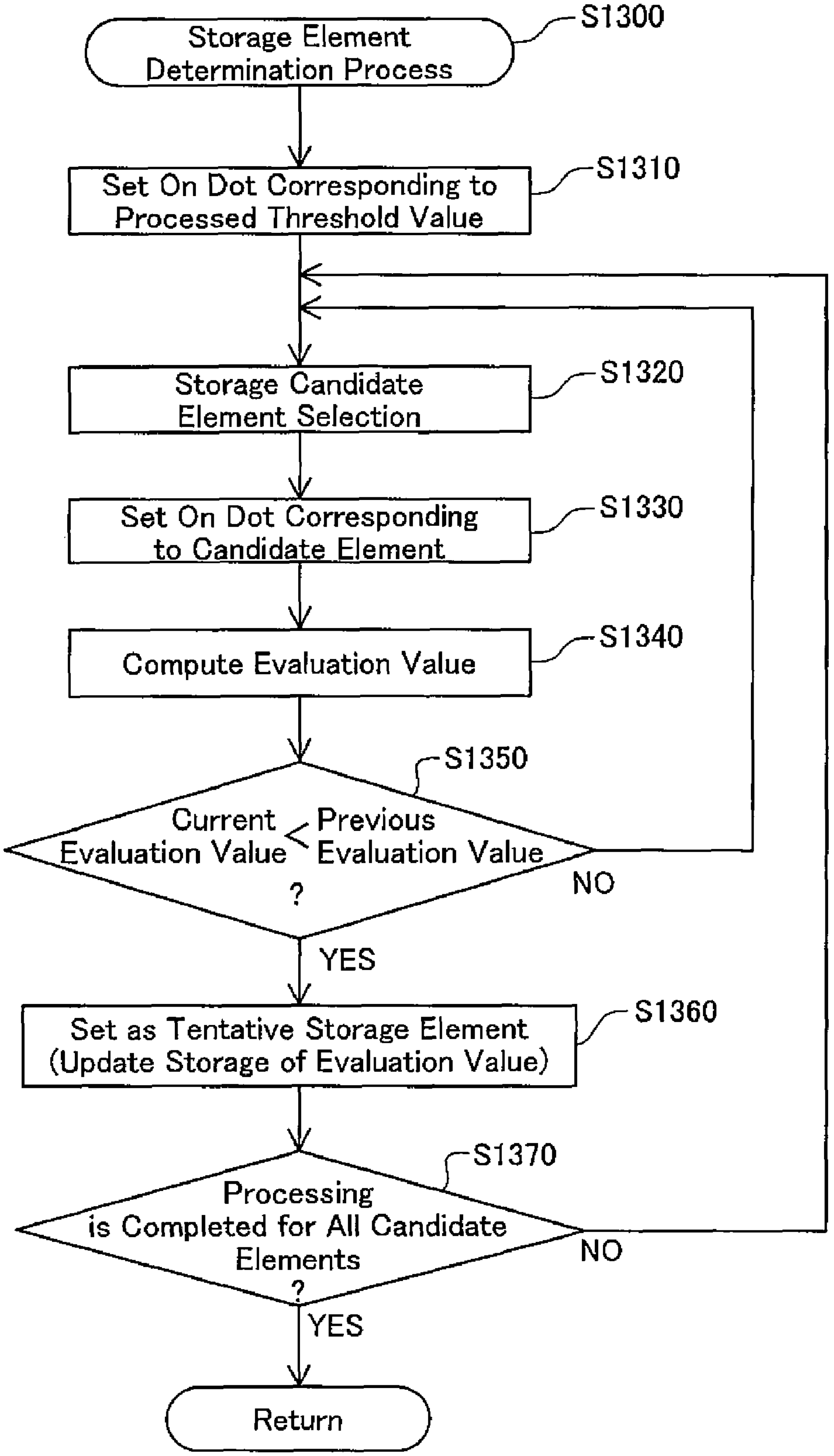
FIG. 24 is a flowchart showing the details of a storage element determination process in the processing routine of dither matrix generation in FIG. 22.

FIG. 24 is a flowchart showing the details of a storage element determination process in the processing routine of dither matrix generation in FIG. 22. At step S1310, a dot corresponding to each processed threshold value is set on. The processed threshold value represents a threshold value for which the storage element is determined. The procedure of this embodiment sequentially selects threshold values in the descending order of dot creation potential as mentioned above. When a dot is created at a target threshold value, a dot is necessarily created in a pixel corresponding to an element at which the processed threshold value is stored. With regard to a smallest input tone value for dot creation at a target threshold value, no dot is created in a pixel corresponding to an element other than the element at which the processed threshold value is stored.

Figure 25:
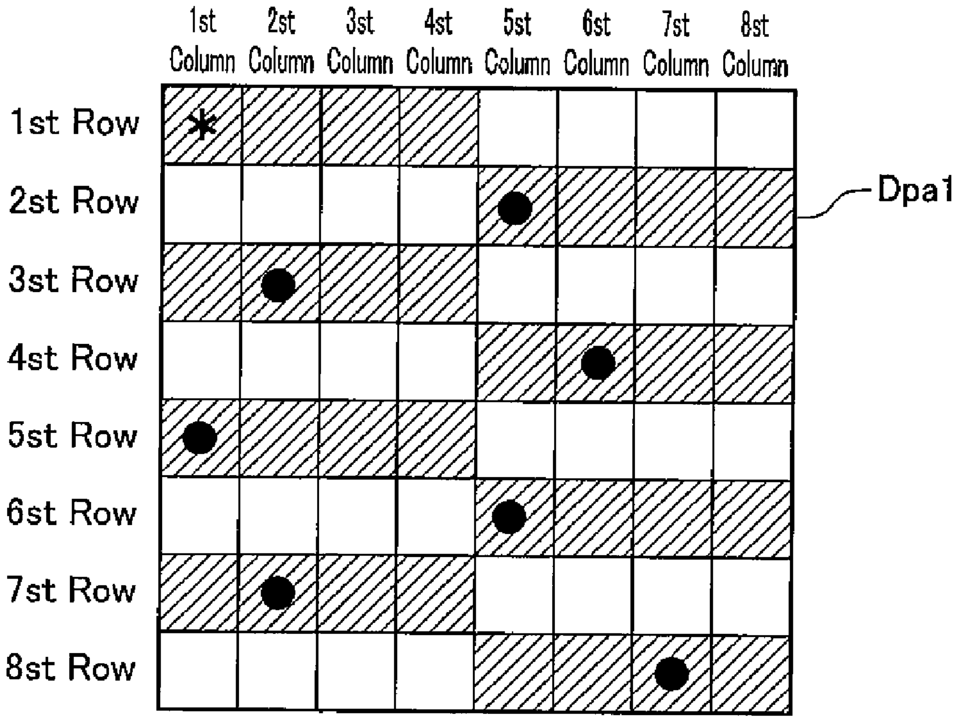
FIG. 25 shows creation of dots (closed circles) in seven pixels based on a matrix having threshold values (0 to 6) of the first through the seventh highest potentials for dot creation set at corresponding seven pixel positions.

FIG. 25 shows creation of dots (closed circles) in seven pixels based on a matrix having threshold values (0 to 6) of the first through the seventh highest potentials for dot creation set at corresponding seven pixel positions. A dot pattern Dpa1 thus obtained is used to specify the position of a pixel where an $8^{th}$ dot is to be created. An element with an asterisk mark will be explained below.

A storage candidate element selection process is performed at step S1320. The storage candidate element selection process sequentially selects elements other than the elements where the processed threshold values have been stored (in the illustrated example of FIG. 25, the elements where the threshold values (0 to 6) of the first through the seventh highest potentials for dot creation have been stored) as a storage candidate of the specified target threshold value. In the illustrated example of FIG. 25, the element at the $1^{st}$ column, $1^{st}$ row position with the asterisk mark is selected as a first storage candidate of the specified target threshold value.

The storage candidate element selection process selects the storage candidate to be suitable for dot allocation according to the dot position allocation matrix AL and the dot number allocation table Dn (FIG. 16). Namely the storage candidates are sequentially selected only among the elements (hatched rectangles) included in the divisional matrix M1 until threshold values are filled in all the elements of the divisional matrix M1, as clearly understood from the dot number allocation table Dn (FIG. 16).

Figure 26:
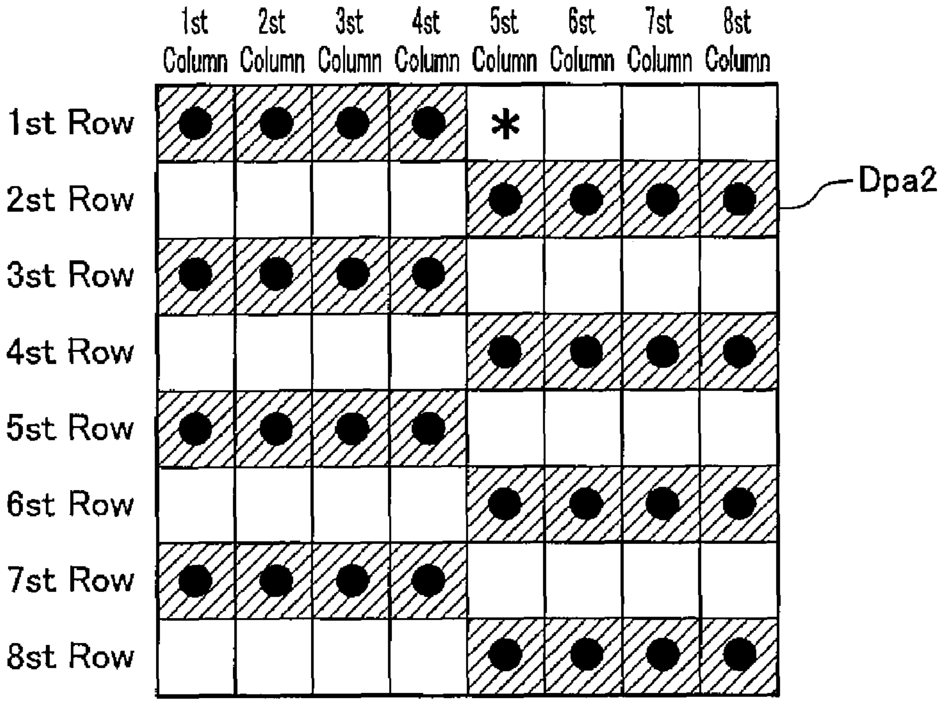
FIG. 26 shows creation of dots (closed circles) in sixteen pixels based on a matrix having threshold values (0 to 15) of the first through the sixteenth highest potentials for dot creation set at corresponding sixteen pixel positions.

FIG. 26 shows creation of dots (closed circles) in sixteen pixels based on a matrix having threshold values (0 to 15) of the first through the sixteenth highest potentials for dot creation set at corresponding sixteen pixel positions. A dot pattern Dpa2 thus obtained is used to specify the position of a pixel where a $17^{th}$ dot is to be created.

At step S1330, a dot corresponding to the selected storage candidate element is set on. The dot corresponding to the selected storage candidate element is set on at step S1330, in addition to a dot group set on as the dots corresponding to the processed threshold values at step S1310.

FIG. 27 shows a dot density matrix Dda1 given as a quantitative expression of dot density representing a quantified dot creation state (dot pattern Dpa1 of FIG. 25) with setting on the dots corresponding to storage candidate elements and the dots corresponding to processed threshold values storage elements. The value '0' represents the dot-off state, and the value '1' represents the dot-on state (including the hypothetic dot-on state in the specified storage candidate element).

An evaluation value computation process is performed at step S1340. The evaluation value computation process computes the granularity index in each pixel group as the evaluation value according to Functions F1 and F2 shown in FIG. 21. The evaluation value is used to improve the image quality with the less granularity based on the human visual sensitivity.

At step S1350, the currently computed evaluation value is compared with a previously computed evaluation value (stored in a non-illustrated buffer). When the currently computed evaluation value is smaller than (more favored over) the stored evaluation value, the currently computed evaluation value is correlated to the currently selected storage candidate element and the storage in the buffer is updated to the currently computed evaluation value. The currently selected storage candidate element is then set as a tentative storage element (step S1360).

This series of processing is performed for all the sequentially selected storage candidate elements (step S1370). The last storage in the buffer is eventually specified as the storage candidate element. On completion of the series of processing for all the sequentially specified threshold values or for all threshold values in a preset range, the dither matrix M is generated (step S1400 in FIG. 22).

The procedure of the second embodiment utilizes the dither matrix M adjusted to be suitable for dot allocation according to the dot position allocation matrix AL and the dot number allocation table Dn (FIG. 16), so as to prevent image degradation due to the mutual interference of the two dot patterns Dy1 and Dy2.

C-1. First Modified Example of Second Embodiment

Figure 28:
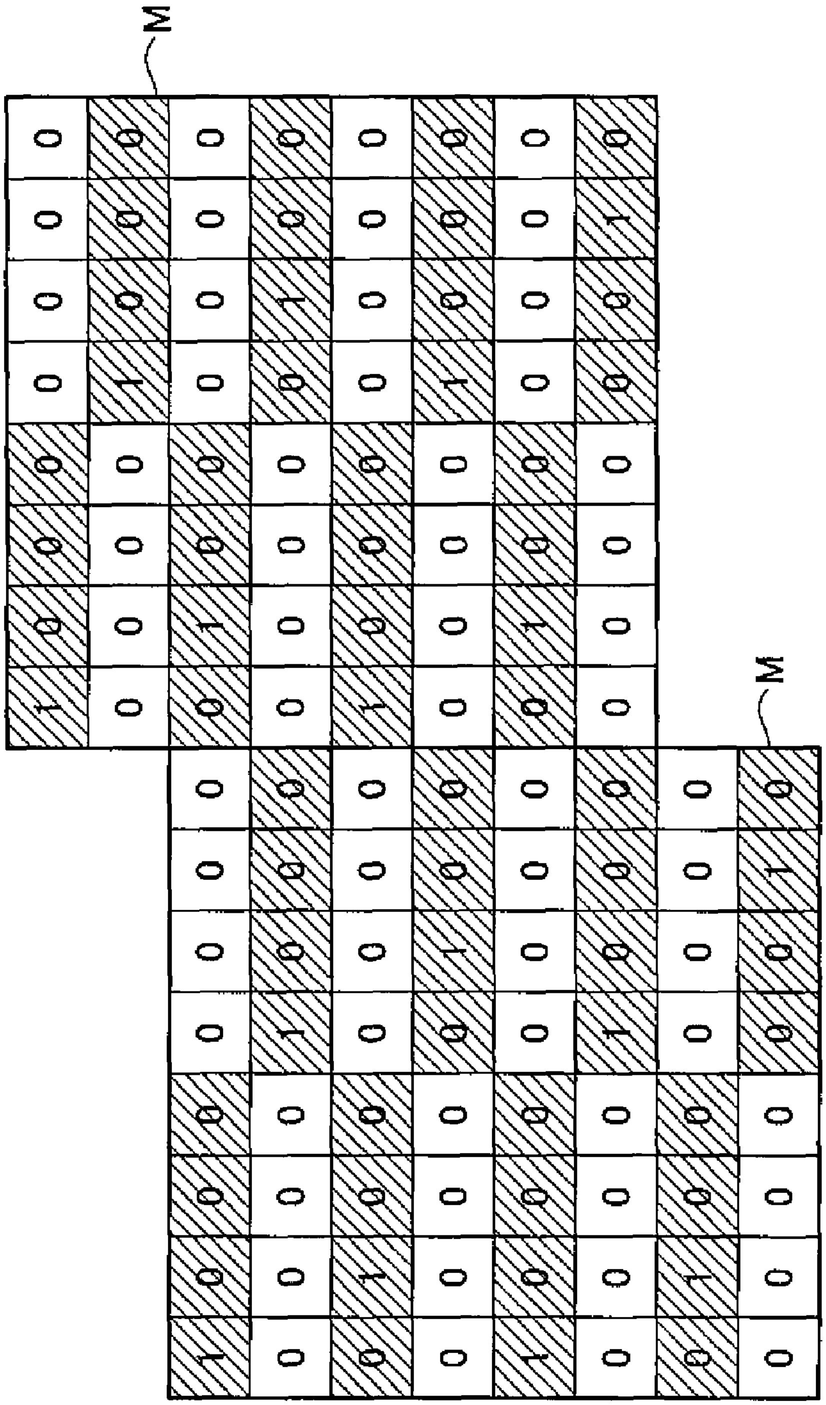
FIG. 28 shows a shift of a dither matrix M in a first modified example of the second embodiment.

FIG. 28 shows a shift of a dither matrix M in a first modified example of the second embodiment. In this illustrated example, the shift of the dither matrix M is determined to maintain the relative positional relation of the first pixel group to the second pixel group across the range of the individual dither matrix M. In this manner, the dither matrix M of the second embodiment may be shifted for application.

The shift of a dither matrix aims to reduce the low-frequency noise occurring at the arrangement cycle of the dither matrix and improve the image quality. The halftoning process with application of an identical dither matrix to an identical tone value causes dots to be created at identical pixel positions in the dither matrix. This leads to generation of the low-frequency noise at the arrangement cycle of the dither matrix.

C-2. Second Modified Example of Second Embodiment

Figure 29:
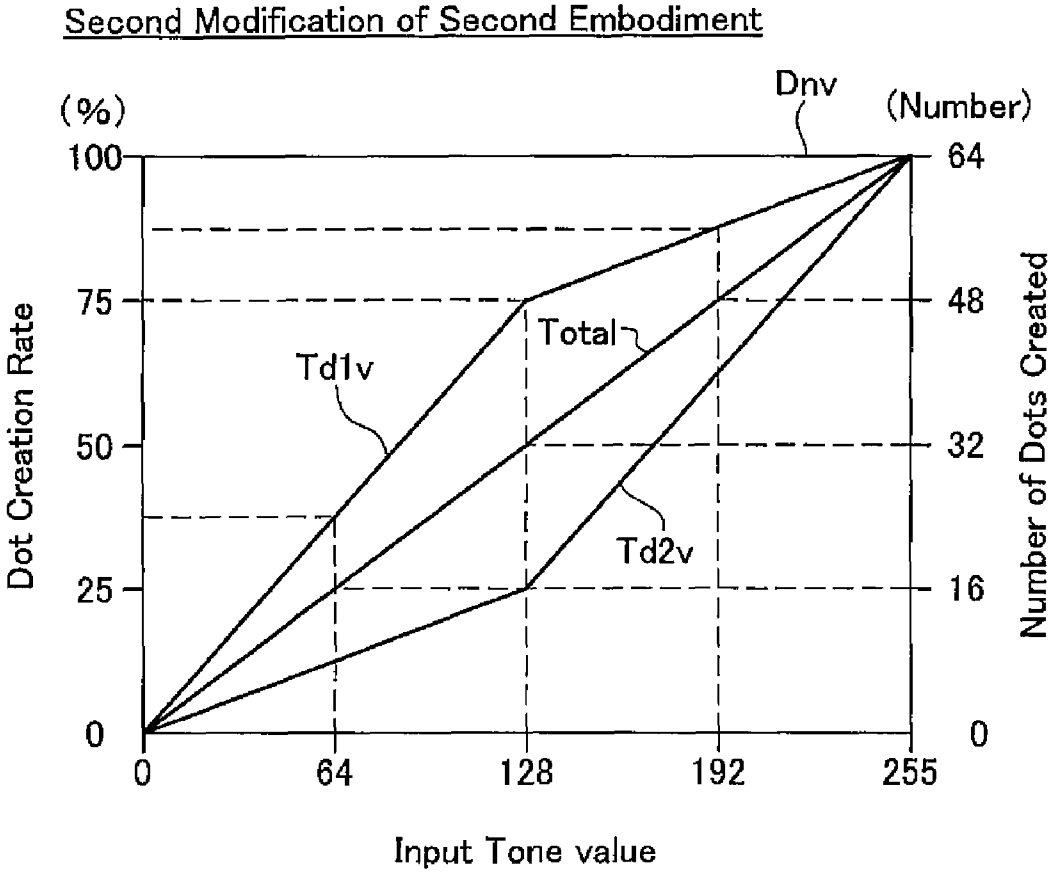
FIG. 29 shows the contents of a dot number allocation table Dnv adopted in a second modified example of the second embodiment.

FIG. 29 shows the contents of a dot number allocation table Dnv adopted in a second modified example of the second embodiment. Like the dot number allocation table Dn of the second embodiment (FIG. 16), the dot number allocation table Dnv of the second modified example is used to determine allocation of target dot-on numbers in the first pixel group and in the second pixel group at each input tone value. The dot number allocation table Dnv of the second modified example, however, includes a curve Td1*v* and a curve Tdv2 as the relation of the dot creation rate in the first pixel group to the input tone value and as the relation of the dot creation rate in the second pixel group to the input tone value, in place of the curve Td1 and the curve Td2 used in the dot number allocation table Dn of the second embodiment (FIG. 16).

For example, at the input tone value of 128, the dot creation rate in the first pixel group, the dot creation rate in the second pixel group, and the total number of dots to be created in pixels are respectively equal to 100% (32 dots), 0% (0 dot), and 32 dots according to the dot number allocation table Dn of the second embodiment (FIG. 16). The dot creation rate in the first pixel group, the dot creation rate in the second pixel group, and the total number of dots to be created in pixels at the input tone value of 128 are respectively equal to 75% (24 dots), 25% (8 dots), and 32 dots according to the dot number allocation table Dnv of the second modified example. The dot number allocation table Dn of the second embodiment gives the perfect priority to dot creation in the first pixel group over dot creation in the second pixel group. The dot number allocation table Dnv of the second modified example, however, has the reduced priority to dot creation in the first pixel group.

Such adjustment (reduction) of priority allows control of tradeoff between the granularity of dots and the image degradation due to the mutual interference of the two dot patterns. Because of the perfect priority to dot creation in the first pixel group, the dither matrix generation process of the second embodiment allows selection of storage candidate elements only among the elements included in the divisional matrix M1 until threshold values are filled in all the elements of the divisional matrix M1. This leads to the low degree of freedom in selection of storage candidate elements. The adjustment (reduction) of priority decreases the image degradation due to the mutual interference of the two dot patterns and improves the granularity of dots.

C-3. Third Modified Example of Second Embodiment

Figure 30:
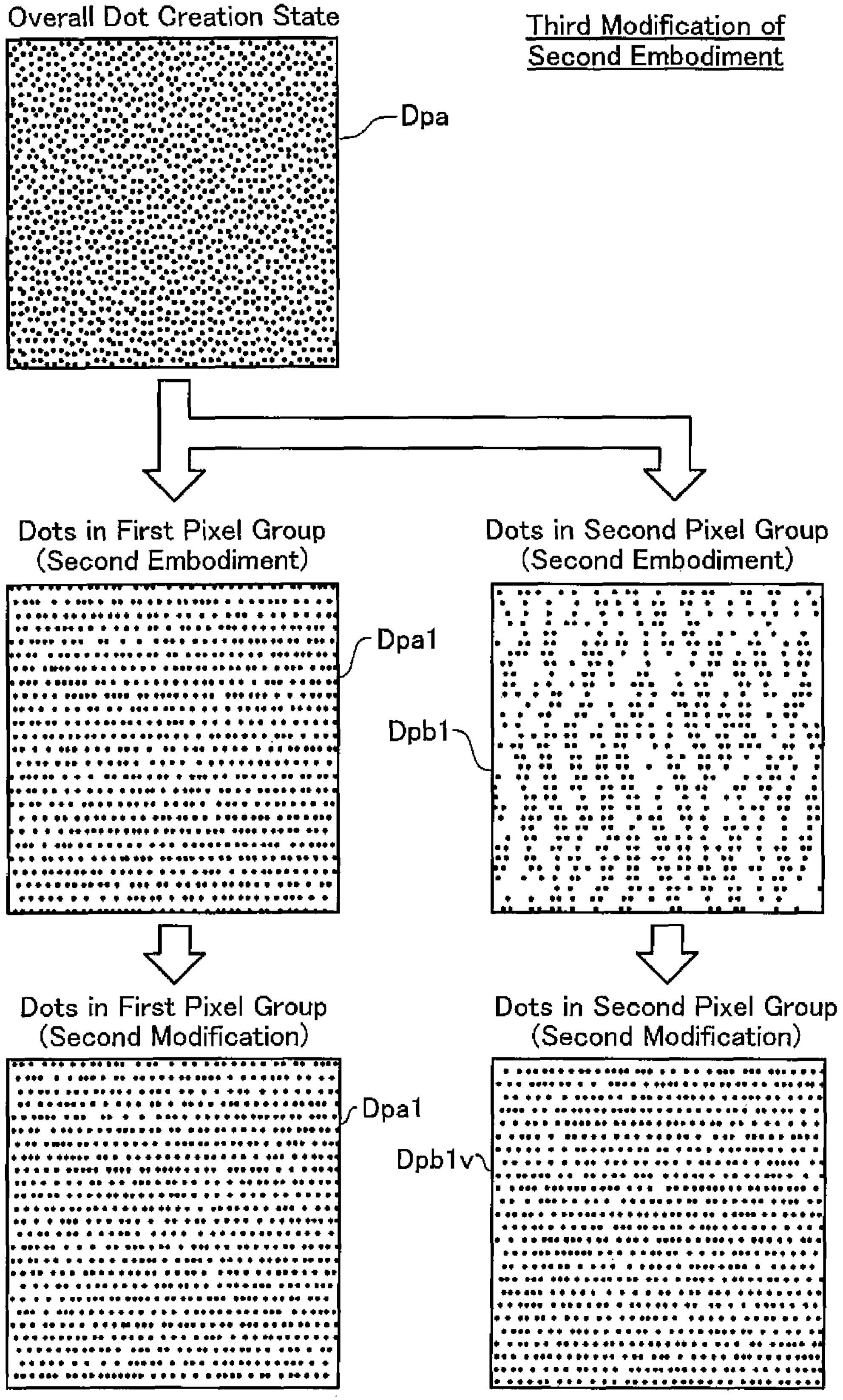
FIG. 30 shows dot patterns of two pixel groups in a third modified example of the second embodiment.

FIG. 30 shows dot patterns of the two pixel groups in a third modified example of the second embodiment. Not only a dot pattern Dpa actually formed on the printing medium but respective dot patterns Dpa1 and Dpb1*v* generated for the first pixel group and for the second pixel group have reduced granularity of dots in the third modified example of the second embodiment. The dither matrix M of the second embodiment is designed to practically reduce the granularity of dots with regard to the dot pattern Dpa1 for the first pixel group. The third modified example reduces the granularity of dots with regard to the dot pattern Dpb1*v* for the second pixel group, while a dot pattern Dpb1 generated for the second pixel group in the second embodiment has no reduction of granularity.

The granularity of dots in the dot pattern generated for the second pixel group, in combination with the mutual interference of the two dot patterns due to the meandering scan, appears as unevenness of density. The reduction of such granularity thus advantageously prevents the unevenness of density. This arrangement is especially effective for the second modified example of the second embodiment with creation of dots in both the first pixel group and the second pixel group at relatively low tone values.

FIG. 31 shows two dot density matrices Dda1 and Dda2 corresponding to the two pixel groups in the third modified example of the second embodiment. FIG. 32 shows a calculation equation of an evaluation value using the two dot density matrices Dd11 and Dda2 in the third modified example of the second embodiment. The calculation equation of the evaluation value gives the sum of a first term for computing a granularity index Ga with regard to all the pixels and a second term for computing granularity indexes Gg1 and Gg2 with regard to the respective pixel groups.

The granularity index Ga with regard to all the pixels in the first term is computed as the degree of granularity affecting the image quality according to Functions F1 and F2 of in the same manner as described above the second embodiment. The granularity indexes Gg1 and Gg2 with regard to the respective pixel groups in the second term are computed similarly as the degrees of image-quality-affecting granularity in the respective pixel groups.

The first term and the second term are respectively weighted with weighting coefficients Wa and Wg. The weighting coefficient Wa is increased to give the priority to the granularity of all pixels, whereas the weighting coefficient Wg is increased to give the priority to the granularity in the respective pixel groups. The granularity indexes Gg1 and Gg2 may be multiplied with respective weighting coefficients. In this case, it is preferable to set the greater weighting coefficient for the granularity index Gg1 than the weighting coefficient for the granularity index Gg2.

C4. Fourth Modified Example of Second Embodiment

Figure 33:
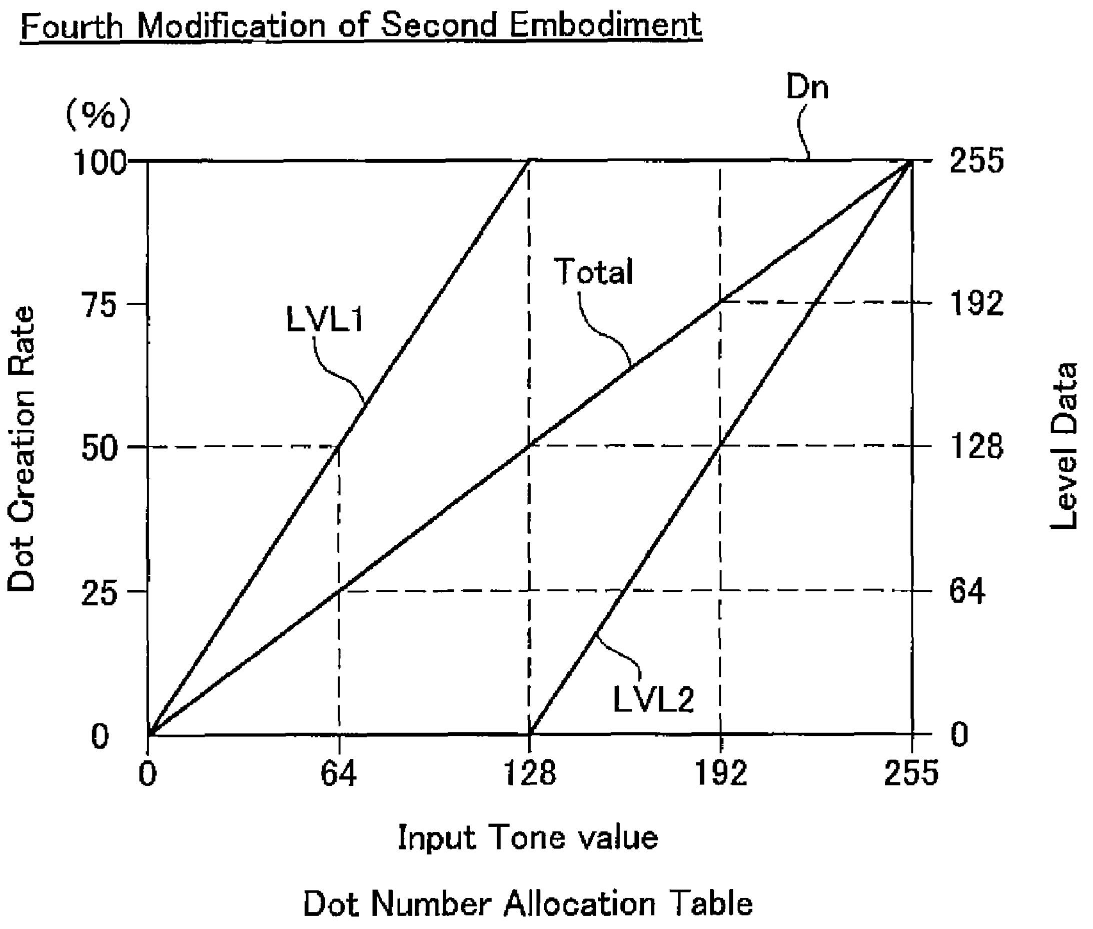
FIG. 33 shows a relation between input tone value and level data adopted in a halftoning process in a fourth modified example of the second embodiment.

FIG. 33 shows a relation between the input tone value and the level data adopted in a halftoning process in a fourth modified example of the second embodiment. The halftoning process performed in the fourth modified example of the second embodiment does not use the dither matrix M designed to prevent image degradation due to the meandering scan but uses a general dither matrix with adjustment of level data LVL to prevent image degradation.

The relation between the level data LVL to the input tone value is shown by a curve LVL1 with regard to the first pixel group and by a curve LVL2 with regard to the second pixel group. At an input tone value of 128, the level data LVL is equal to 128 for the pixels included in the first pixel group and is equal to 0 for the pixels included in the second pixel group.

The technique of the invention may be actualized by adjusting the dither matrix as explained in the second embodiment, by adjusting the level data LVL specified at each input tone value as explained in the fourth modified example, or by adjusting both the dither matrix and the level data LVL.

The technique of the invention may also be actualized by a halftoning process according to the error diffusion method, that is, by adjusting (for example, fixing) threshold values as the base for determining the dot on-off state. For example, the threshold values applied to the pixels in the second pixel group are set greater than the threshold values applied to the pixels in the first pixel group.

D. Other Aspects

The embodiments and their modified examples discussed above are to be considered in all aspects as illustrative and not restrictive. There may be many other modifications, changes, and alterations without departing from the scope or spirit of the main characteristics of the present invention. Components of the embodiments other than those commonly disclosed in independent claims are additional elements and may be omitted according to the requirements.

D-1. The above embodiments regard the line printer using the two print heads 10A and 10B to complete printing by one scan. The technique of the invention is also applicable to a serial printer that completes printing by multiple scans of one print head. The multiple scans may cause a variation in vibration of the print head, due to a variation in scanning direction or a variation in vibration phase.

D-2. The above embodiments adopt the dither method for the halftoning process. The halftoning process may alternatively be performed by the error diffusion method with adjustment of at least one of the threshold values and the input tone values. For example, the threshold values for pixels or a pixel group as a skipping object may be increased, or the input tone values may be biased to decrease. Non-application of the bias to the diffused errors prevents the occurrence of the bias-based density error.

D-3. In the embodiments described above, the granularity index is used as the evaluation measure of the dither matrix. An RMF granularity may be used as the evaluation measure. The RMS granularity is specified by applying a low pass filter to dot density values and calculating a standard deviation of the low pass-filtered dot density values. One simplified procedure may specify an element corresponding to the pixel having the low dot density value as the storage element for each target threshold value.

Another procedure may be adopted to generate the dither matrix. This modified procedure provides a base dither matrix and specifies storage elements of threshold values with partial replacement of threshold values stored in certain elements with threshold values stored in other elements to complete a dither matrix. In this case, a variation in density of dots created in a predetermined element group may be used as part of an evaluation function. A dot density matrix used as the evaluation basis may be prepared corresponding to the smallest input tone value for dot creation at the target threshold value or corresponding to a greater input tone value.

D-4. In the embodiments described above, the respective nozzle arrays C, Mz, Y, and K provided on one print head 10A have the zigzag arrangement relative to the respective nozzle arrays C, Mz, Y, and K provided on the other print head 10B. This zigzag arrangement reduces the uneven color caused by the contact of dots in an identical color. The two print heads 10A and 10B are, however, not essential. The technique of the invention is applicable to the structure with only one print head to prevent the contact of dots in different colors, for example, the contact of cyan dots with magenta dots. A potential variation in hue caused by prevention of such contact may be reduced by changing over the dot skipping at a specific cycle in a high frequency domain having the low human visual sensitivity.

D-5. In the embodiments described above, dots are skipped by adjusting the dot data. One modified procedure may skip dots by changing the control of the control circuit 40 (FIG. 2) to drive the print heads 10A and 10B for ink ejection and dot creation. For example, the dot skipping shown in FIG. 8 may be implemented by cutting off a driving signal to the print head 10B in printing a graphic area. The ink density may be compensated (see FIG. 15) by changing the waveform of the drive signal instead of correcting the dot data.

D-6. The above embodiments regard application of the liquid ejection device to the inkjet recording device. This is, however, neither essential nor restrictive. The technique of the invention may be applied to various fluid ejection devices configured to eject, spray, or jet any of various fluids, for example, a liquid other than ink, a dispersion liquid of particles of a functional material, a gel-like fluid, or a fluid of solid particles. For example, the technique of the invention is applicable to a liquid form ejection device configured to eject a liquid form including dispersed or dissolved electrode material, color material, or any other material used of manufacture of liquid crystal displays, EL (electro luminescence) displays, surface emitting displays, and color filters, a liquid ejection device configured to eject a bioorganic substance used for manufacture of biochips, and a liquid ejection device used as a precision pipette and configured to eject a sample solution.

The technique of the invention is also applicable to a liquid ejection device configured to eject a lubricating oil at pinpoint in precision machines such as watches and cameras, a liquid ejection device configured to eject a transparent resin solution of, for example, ultraviolet curable resin, to a substrate to prepare a hemispherical micro lens (optical lens) used for optical communication elements, a liquid ejection device configured to eject an acid or alkali etching solution to etch a substrate, a fluid ejection device configured to eject a gel, and a powder ejection recording device configured to eject solid powder like toner.

What is claimed is:

1. A liquid ejection device constructed to eject a liquid to an ejection object, the liquid ejection device comprising:

an ejection head structured to have a nozzle array including multiple nozzles aligned in a specific direction crossing a scanning direction;

a dot data generator configured to generate dot data from given data, where the dot data represents a dot creation state corresponding to droplets of the liquid to be ejected in each unit set on the ejection object; and a liquid ejector configured to make multiple scans of the ejection head with the nozzle array in the scanning direction in a common printing area according to the generated dot data and eject droplets of the liquid to the ejection object to create dots, wherein the dot data generator has a specific print mode that generates corrective dot data by skipping a virtual dot array created by at least one scan from a group of dot arrays to be created by the multiple scans of the nozzle array, in order to prevent a potential contact with a dot array to be created by another scan.

2. The liquid ejection device in accordance with claim 1, wherein the print mode generates the corrective dot data by applying a dither matrix designed to skip dots at positions having a potential for the contact with the dot array to be created by the another scan, as the virtual dot array created by the at least one scan.

3. The liquid ejection device in accordance with claim 2, wherein the dither matrix is designed to have a minimum potential for succession of dots in the specific direction crossing the scanning direction.

4. The liquid ejection device in accordance with claim 1, the liquid ejection device having:

a liquid ejection head constructed to have multiple nozzle arrays arranged apart from each other across a preset distance in the scanning direction, where only one scan of the liquid ejection head makes the multiple nozzle arrays simultaneously eject the liquid to the ejection object and thereby completes the multiple scans of the ejection head in the scanning direction in the common printing area.

5. The liquid ejection device in accordance with claim 1, wherein the multiple scans of the ejection head in the scanning direction in the common printing area include plural scans of ejecting an identical liquid at mutually zigzag positions in the specific direction crossing the scanning direction, and an ejection amount of the liquid in at least one remaining scan out of the plural scans is increased to compensate for a potential decrease in total ejection amount of the liquid caused by skipping the virtual dot array created by the at least one scan.

6. A liquid ejection method of ejecting a liquid to an ejection object the liquid ejection method comprising:

a head preparation step of providing an ejection head structured to have a nozzle array including multiple nozzles aligned in a specific direction crossing a scanning direction;

a dot data generation step of generating dot data from given data, where the dot data represents a dot creation state corresponding to droplets of the liquid to be ejected in each unit set on the ejection object; and a liquid ejection step of making multiple scans of the ejection head with the nozzle array in the scanning direction in a common printing area according to the generated dot data and ejecting droplets of the liquid to the ejection object to create dots, wherein the dot data generation step generates corrective dot data by skipping a virtual dot array created by at least one scan from a group of dot arrays to be created by the multiple scans of the nozzle array, in order to prevent a potential contact with a dot array to be created by another scan.

7. A computer product configured to generate dot data used in ejection of a liquid to an ejection object, the computer product comprising:

a non-transitory recording medium; and a set of program codes recorded in the recording medium, the set of program codes including:

a first program code of inputting data as a base for ejecting the liquid to the ejection object; and a second program code of generating dot data, which represents a dot creation state corresponding to droplets of the liquid to be ejected in each unit set on the ejection object, from the input data by skipping a virtual dot array created by at least one scan from a group of dot arrays to be created by multiple scans of a nozzle array including multiple nozzles aligned in a specific direction crossing a scanning direction, in order to prevent a potential contact with a dot array to be created by another scan.

* * * * *